(12) United States Patent
Rust

(10) Patent No.: US 11,485,298 B2
(45) Date of Patent: Nov. 1, 2022

(54) FEEDER MODULE IN PLANETARY ROLLER EXTRUDER DESIGN

(71) Applicant: Entex Rust & Mitschke GmbH, Bochum (DE)

(72) Inventor: Harald Rust, Bochum (DE)

(73) Assignee: Entex Rust & Mitschke GmbH, Bochum (DE)

( * ) Notice: Subject to any disclaimer, the term of this patent is extended or adjusted under 35 U.S.C. 154(b) by 744 days.

(21) Appl. No.: 16/462,217

(22) PCT Filed: Jul. 3, 2018

(86) PCT No.: PCT/EP2018/000335
§ 371 (c)(1),
(2) Date: May 18, 2019

(87) PCT Pub. No.: WO2019/011461
PCT Pub. Date: Jan. 17, 2019

(65) Prior Publication Data
US 2019/0329450 A1 Oct. 31, 2019

(30) Foreign Application Priority Data
Jul. 13, 2017 (DE) ...................... 10 2017 006 638.8

(51) Int. Cl.
*B29C 48/655* (2019.01)
*B60R 13/08* (2006.01)
(Continued)

(52) U.S. Cl.
CPC ............ *B60R 13/083* (2013.01); *B29B 7/485* (2013.01); *B29B 7/489* (2013.01); *B29B 7/7495* (2013.01);
(Continued)

(58) Field of Classification Search
CPC ....... B29C 48/655; B29C 48/44; B29B 7/285; B29B 7/7495
(Continued)

(56) References Cited

U.S. PATENT DOCUMENTS 2,802,238 A 8/1957 Roberto
3,233,025 A 2/1966 Frye et al.
(Continued)

FOREIGN PATENT DOCUMENTS

CA 698518 A 11/1964
DE 1954214 U 1/1967
(Continued)

*Primary Examiner* — Marc C Howell
(74) *Attorney, Agent, or Firm* — Smartpat PLC

(57) ABSTRACT

A planetary roller extruder section forms a feed part of an extruder. The planetary roller extruder has an internally toothed housing and an externally toothed central spindle disposed centrally within and at a distance from the housing. Planetary spindles are arranged to rotate in a void between the central spindle and the housing. Each planetary spindle has an external toothing meshing with both the housing and the central spindle. At least one planetary spindle has two axially spaced areas with less than a full set of teeth. Those axially spaced areas include a first area having a first number of teeth and a second area having a second number of teeth. The second number of teeth is less than a full set of teeth and more than the first number of teeth.

11 Claims, 14 Drawing Sheets

(51) Int. Cl.
  *B29C 48/44* (2019.01)
  *B29C 48/285* (2019.01)
  *B29B 7/48* (2006.01)
  *B29B 7/74* (2006.01)
  *B29B 7/84* (2006.01)
  *B29C 48/435* (2019.01)
  *B29C 48/60* (2019.01)
  *B60N 3/04* (2006.01)

(52) U.S. Cl.
  CPC ............ *B29B 7/845* (2013.01); *B29C 48/288* (2019.02); *B29C 48/435* (2019.02); *B29C 48/44* (2019.02); *B29C 48/60* (2019.02); *B29C 48/655* (2019.02); *B60N 3/048* (2013.01)

(58) Field of Classification Search
  USPC ......................................................... 366/83
  See application file for complete search history.

(56) References Cited

U.S. PATENT DOCUMENTS

| | | |
|---|---|---|
| 3,642,964 A | 2/1972 | Rausch et al. |
| 4,176,967 A | 12/1979 | Brinkmann et al. |
| 4,192,617 A | 3/1980 | Spielhoff |
| 4,268,176 A | 5/1981 | Muller |
| 4,555,366 A | 11/1985 | Rodgers et al. |
| 4,981,711 A | 1/1991 | Kearns et al. |
| 5,045,325 A | 9/1991 | Lesko et al. |
| 5,135,760 A | 8/1992 | Degady et al. |
| 5,204,377 A | 4/1993 | Fukawa et al. |
| 5,346,963 A | 9/1994 | Hughes et al. |
| 5,356,574 A | 10/1994 | Tamaki et al. |
| 5,536,462 A | 7/1996 | Hawrylko |
| 5,540,868 A | 7/1996 | Stouffer et al. |
| 5,550,186 A | 8/1996 | Cantrill et al. |
| 5,626,420 A | 5/1997 | Deal et al. |
| 5,776,887 A | 7/1998 | Wibert et al. |
| 5,814,714 A | 9/1998 | Palomo et al. |
| 5,852,115 A | 12/1998 | Young et al. |
| 5,928,419 A | 7/1999 | Uemura et al. |
| 5,947,593 A | 9/1999 | Inoue et al. |
| 5,964,979 A | 10/1999 | George et al. |
| 5,967,919 A | 10/1999 | Bakker |
| 6,133,173 A | 10/2000 | Riedel et al. |
| 6,150,017 A | 11/2000 | Burmeister et al. |
| 6,179,458 B1 | 1/2001 | Albers et al. |
| 6,214,935 B1 | 4/2001 | Sasaki et al. |
| 6,221,965 B1 | 4/2001 | Gräbner et al. |
| 6,303,071 B1 | 10/2001 | Sugawara et al. |
| 6,506,447 B1 | 1/2003 | Hirsch et al. |
| 6,667,372 B1 | 12/2003 | Miyake et al. |
| 6,740,693 B1 | 5/2004 | Gorny et al. |
| 6,780,271 B1 | 8/2004 | Burmeister et al. |
| 6,822,048 B1 | 11/2004 | Burmeister et al. |
| 6,977,239 B1 | 12/2005 | Weuthen et al. |
| 7,049,279 B1 | 5/2006 | Weuthen et al. |
| 7,476,416 B2 | 1/2009 | Tynan et al. |
| 2001/0023278 A1 | 9/2001 | Rowland et al. |
| 2002/0106508 A1 | 8/2002 | Wenninger et al. |
| 2003/0015814 A1 | 1/2003 | Krull et al. |
| 2003/0022809 A1 | 1/2003 | Weuthen et al. |
| 2003/0027741 A1 | 2/2003 | Weuthen et al. |
| 2003/0039823 A1 | 2/2003 | Wenninger et al. |
| 2003/0138624 A1 | 7/2003 | Burmeister et al. |
| 2003/0144172 A1 | 7/2003 | Weuthen et al. |
| 2003/0186050 A1 | 10/2003 | Galle et al. |
| 2003/0207992 A1 | 11/2003 | Mussig et al. |
| 2004/0033362 A1 | 2/2004 | Mino |
| 2004/0053023 A1 | 3/2004 | Galle et al. |
| 2004/0094862 A1 | 5/2004 | Sturm et al. |
| 2004/0197069 A1 | 10/2004 | Mizota et al. |
| 2004/0232578 A1 | 11/2004 | Magni et al. |
| 2005/0001350 A1 | 1/2005 | Innerebner et al. |
| 2005/0004287 A1 | 1/2005 | Burmeister et al. |
| 2005/0031855 A1 | 2/2005 | Heuer et al. |
| 2005/0069721 A1 | 3/2005 | Biasoli et al. |
| 2005/0100718 A1 | 5/2005 | Peiffer et al. |
| 2005/0100729 A1 | 5/2005 | Peiffer et al. |
| 2005/0100750 A1 | 5/2005 | Peiffer et al. |
| 2005/0118412 A1 | 6/2005 | Peiffer et al. |
| 2005/0121817 A1 | 6/2005 | Konig et al. |
| 2005/0121822 A1 | 6/2005 | Peiffer et al. |
| 2005/0158555 A1 | 7/2005 | Anders et al. |
| 2005/0173050 A1 | 8/2005 | Peiffer et al. |
| 2005/0272839 A1 | 12/2005 | Bauer et al. |
| 2006/0014857 A1 | 1/2006 | Sapper et al. |
| 2006/0029760 A1 | 2/2006 | Kreft et al. |
| 2006/0052472 A1 | 3/2006 | Hansen et al. |
| 2006/0079709 A1 | 4/2006 | Gurtler et al. |
| 2006/0084734 A1 | 4/2006 | Bauer et al. |
| 2006/0160938 A1 | 7/2006 | Zierer et al. |
| 2006/0234047 A1 | 10/2006 | Wenninger et al. |
| 2007/0027300 A1 | 2/2007 | Zierer et al. |
| 2007/0055017 A1 | 3/2007 | Schultes et al. |
| 2007/0055032 A1 | 3/2007 | Langenbuch et al. |
| 2007/0066708 A1 | 3/2007 | Goldacker et al. |
| 2007/0085231 A1 | 4/2007 | Menges et al. |
| 2007/0161746 A1 | 7/2007 | Weber |
| 2007/0173622 A1 | 7/2007 | Tynan et al. |
| 2007/0221941 A1 | 9/2007 | Jeong et al. |
| 2008/0118751 A1 | 5/2008 | Zollner et al. |
| 2008/0249241 A1 | 10/2008 | Heiliger et al. |
| 2008/0269415 A1 | 10/2008 | Spyrou et al. |
| 2009/0069465 A1 | 3/2009 | Austrup et al. |
| 2009/0221744 A1 | 9/2009 | Thormeier et al. |
| 2009/0236766 A1 | 9/2009 | Rust et al. |
| 2009/0298961 A1 | 12/2009 | Baumgart et al. |
| 2010/0191113 A1 | 7/2010 | Hazard et al. |
| 2013/0023639 A1 | 1/2013 | Rust |
| 2013/0036713 A1 | 2/2013 | Daute et al. |
| 2013/0039872 A1 | 2/2013 | Daute et al. |
| 2013/0093114 A1 | 4/2013 | Rust et al. |
| 2013/0109763 A1 | 5/2013 | Daute et al. |
| 2015/0043300 A1 | 2/2015 | Rust |
| 2015/0191578 A1 | 7/2015 | Rust |
| 2015/0283728 A1* | 10/2015 | Rust ....................... B29B 7/421 366/81 |
| 2017/0362407 A1 | 12/2017 | Rust |
| 2018/0126597 A1 | 5/2018 | Rust |
| 2018/0126623 A1 | 5/2018 | Rust |
| 2018/0251624 A1 | 9/2018 | Rust |
| 2018/0281263 A1 | 10/2018 | Rust |

FOREIGN PATENT DOCUMENTS

| | | |
|---|---|---|
| DE | 1964834 U | 7/1967 |
| DE | 2303366 A1 | 7/1974 |
| DE | 2447368 A1 | 4/1976 |
| DE | 2702390 A1 | 7/1978 |
| DE | 2059570 B2 | 7/1979 |
| DE | 141975 A3 | 6/1980 |
| DE | 2719095 C2 | 7/1984 |
| DE | 3738335 A1 | 5/1988 |
| DE | 3712749 C1 | 7/1988 |
| DE | 3908415 A1 | 9/1990 |
| DE | 4111217 C1 | 7/1992 |
| DE | 4308098 A1 | 9/1994 |
| DE | 68915788 | 10/1994 |
| DE | 69207369 | 6/1996 |
| DE | 19534239 A1 | 3/1997 |
| DE | 19548136 A1 | 6/1997 |
| DE | 69306874 | 7/1997 |
| DE | 69312246 D1 | 8/1997 |
| DE | 69312852 T2 | 1/1998 |
| DE | 19638094 A1 | 3/1998 |
| DE | 19749443 A1 | 5/1998 |
| DE | 19653790 A1 | 6/1998 |
| DE | 68928567 T2 | 8/1998 |
| DE | 19720916 A1 | 11/1998 |
| DE | 19726415 A1 | 12/1998 |
| DE | 19730854 A1 | 1/1999 |
| DE | 19806609 A1 | 8/1999 |
| DE | 69419146 T2 | 10/1999 |

(56) References Cited

FOREIGN PATENT DOCUMENTS

| | | |
|---|---|---|
| DE | 19819349 A1 | 11/1999 |
| DE | 19824071 A1 | 12/1999 |
| DE | 19856235 A1 | 5/2000 |
| DE | 20003297 U1 | 7/2000 |
| DE | 19930970 A1 | 11/2000 |
| DE | 19939073 A1 | 2/2001 |
| DE | 19939074 A1 | 2/2001 |
| DE | 19939075 A1 | 2/2001 |
| DE | 19939076 A1 | 2/2001 |
| DE | 19939077 A1 | 2/2001 |
| DE | 19939078 A1 | 2/2001 |
| DE | 19953793 A1 | 5/2001 |
| DE | 19953796 A1 | 5/2001 |
| DE | 19954313 A1 | 5/2001 |
| DE | 19956483 A1 | 6/2001 |
| DE | 19956802 A1 | 6/2001 |
| DE | 19956803 A1 | 6/2001 |
| DE | 19958398 A1 | 6/2001 |
| DE | 19960494 A1 | 6/2001 |
| DE | 19962859 A1 | 7/2001 |
| DE | 19962883 A1 | 7/2001 |
| DE | 19962886 A1 | 7/2001 |
| DE | 69427539 D1 | 7/2001 |
| DE | 69428309 D1 | 10/2001 |
| DE | 10036705 A1 | 3/2002 |
| DE | 10036706 A1 | 3/2002 |
| DE | 10036707 A1 | 4/2002 |
| DE | 10050295 A1 | 4/2002 |
| DE | 69709015 T2 | 5/2002 |
| DE | 69622375 D1 | 8/2002 |
| DE | 69707763 | 8/2002 |
| DE | 10059875 A1 | 10/2002 |
| DE | 69711597 | 10/2002 |
| DE | 69715082 | 10/2002 |
| DE | 69715781 | 10/2002 |
| DE | 69710878 T2 | 11/2002 |
| DE | 10130049 A1 | 1/2003 |
| DE | 69807708 T2 | 1/2003 |
| DE | 10142890 A1 | 3/2003 |
| DE | 69808332 T2 | 8/2003 |
| DE | 10137620 A1 | 9/2003 |
| DE | 69725985 D1 | 12/2003 |
| DE | 69628188 T2 | 4/2004 |
| DE | 69908565 T2 | 5/2004 |
| DE | 10257377 A1 | 7/2004 |
| DE | 10334363 A1 | 8/2004 |
| DE | 60012108 D1 | 8/2004 |
| DE | 69630762 T2 | 9/2004 |
| DE | 10333927 A1 | 2/2005 |
| DE | 10340976 A1 | 4/2005 |
| DE | 10340977 A1 | 4/2005 |
| DE | 10343964 A1 | 4/2005 |
| DE | 10345043 A1 | 4/2005 |
| DE | 10349144 A1 | 5/2005 |
| DE | 69829695 | 5/2005 |
| DE | 10351463 A1 | 6/2005 |
| DE | 10352430 A1 | 6/2005 |
| DE | 10352431 A1 | 6/2005 |
| DE | 10352432 A1 | 6/2005 |
| DE | 10352439 A1 | 6/2005 |
| DE | 10352440 A1 | 6/2005 |
| DE | 10352444 A1 | 6/2005 |
| DE | 10354379 A1 | 6/2005 |
| DE | 10354546 A1 | 6/2005 |
| DE | 102004048440 A1 | 6/2005 |
| DE | 102004048794 A1 | 6/2005 |
| DE | 10356821 A1 | 7/2005 |
| DE | 102004002159 A1 | 8/2005 |
| DE | 102004004230 A1 | 8/2005 |
| DE | 102005007952 A1 | 9/2005 |
| DE | 102004023085 A1 | 12/2005 |
| DE | 102004026799 A1 | 12/2005 |
| DE | 69827497 T2 | 1/2006 |
| DE | 102004032694 A1 | 2/2006 |
| DE | 102004038774 A1 | 2/2006 |
| DE | 102004044085 A1 | 3/2006 |
| DE | 102004044086 A1 | 3/2006 |
| DE | 102004046228 A1 | 3/2006 |
| DE | 102004048773 A1 | 4/2006 |
| DE | 102004048875 A1 | 4/2006 |
| DE | 102004050058 A1 | 4/2006 |
| DE | 202006001644 U1 | 4/2006 |
| DE | 60206271 T2 | 6/2006 |
| DE | 102004060966 A1 | 6/2006 |
| DE | 102004061068 A1 | 7/2006 |
| DE | 102004061185 A1 | 7/2006 |
| DE | 60124269 D1 | 12/2006 |
| DE | 102004053929 | 3/2007 |
| DE | 69937111 D1 | 10/2007 |
| DE | 102006033089 A1 | 10/2007 |
| DE | 102004034039 B4 | 4/2008 |
| DE | 102006054204 A1 | 5/2008 |
| DE | 102007041486 A1 | 5/2008 |
| DE | 102004004237 B9 | 7/2008 |
| DE | 102007059299 A1 | 11/2008 |
| DE | 102007049505 A1 | 4/2009 |
| DE | 102007050466 A1 | 4/2009 |
| DE | 102010000253 A1 | 7/2010 |
| DE | 102008058048 A1 | 8/2010 |
| DE | 102009060813 A1 | 7/2011 |
| DE | 102009060851 A1 | 7/2011 |
| DE | 102009060881 A1 | 7/2011 |
| DE | 10342822 | 9/2014 |
| EP | 0854178 A1 | 7/1998 |
| EP | 1056584 A1 | 12/2000 |
| EP | 1078968 A1 | 2/2001 |
| EP | 1080865 A1 | 3/2001 |
| EP | 1067352 B1 | 8/2003 |
| EP | 1833101 A2 | 9/2007 |
| EP | 1844917 A2 | 10/2007 |
| EP | 2098354 A1 | 9/2009 |
| EP | 1167017 B1 | 8/2010 |
| GB | 2175513 B | 2/1988 |
| JP | 3017176 U | 10/1995 |
| JP | H09326731 A | 12/1997 |
| JP | H10235713 A | 9/1998 |
| JP | H1180690 A | 3/1999 |
| JP | H11216754 A | 8/1999 |
| JP | H11216764 A | 8/1999 |
| KR | 20120000701 A | 1/2012 |
| WO | 9411175 A1 | 5/1994 |
| WO | 9942276 A1 | 8/1999 |
| WO | 03031153 A1 | 4/2003 |
| WO | 2004037941 A2 | 5/2004 |
| WO | 2004101626 A1 | 11/2004 |
| WO | 2004101627 A1 | 11/2004 |
| WO | 2007087465 A2 | 8/2007 |
| WO | 2014056553 A1 | 4/2014 |

* cited by examiner

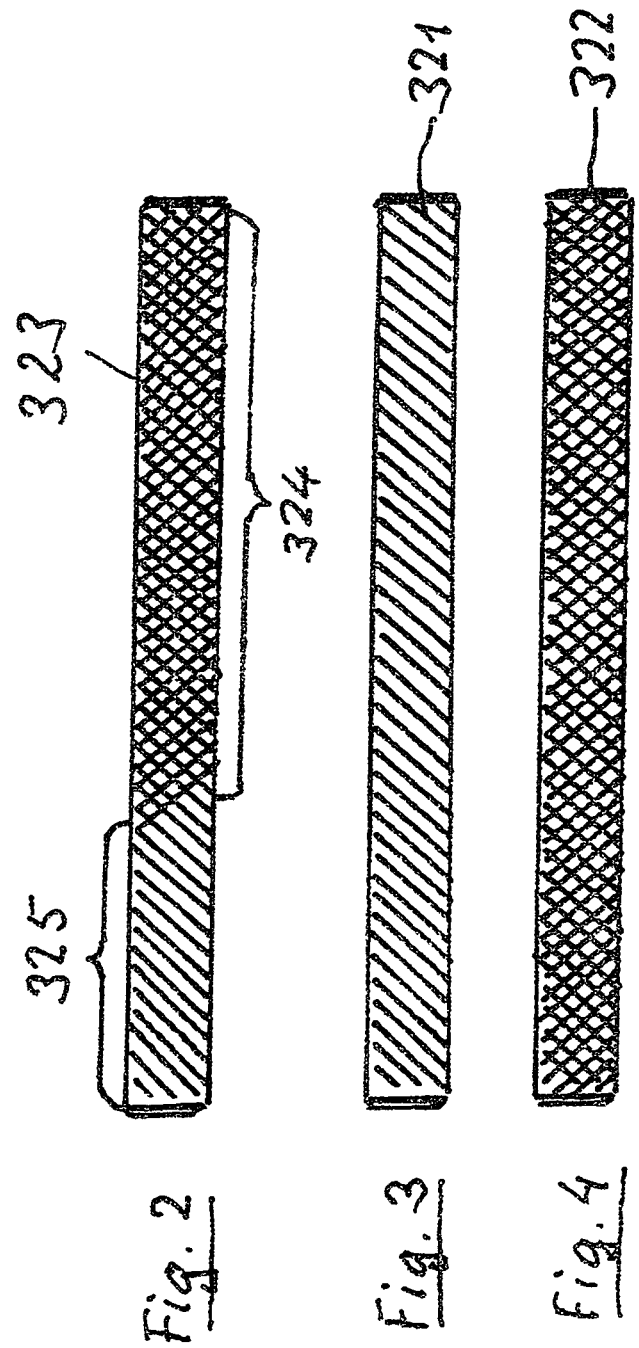

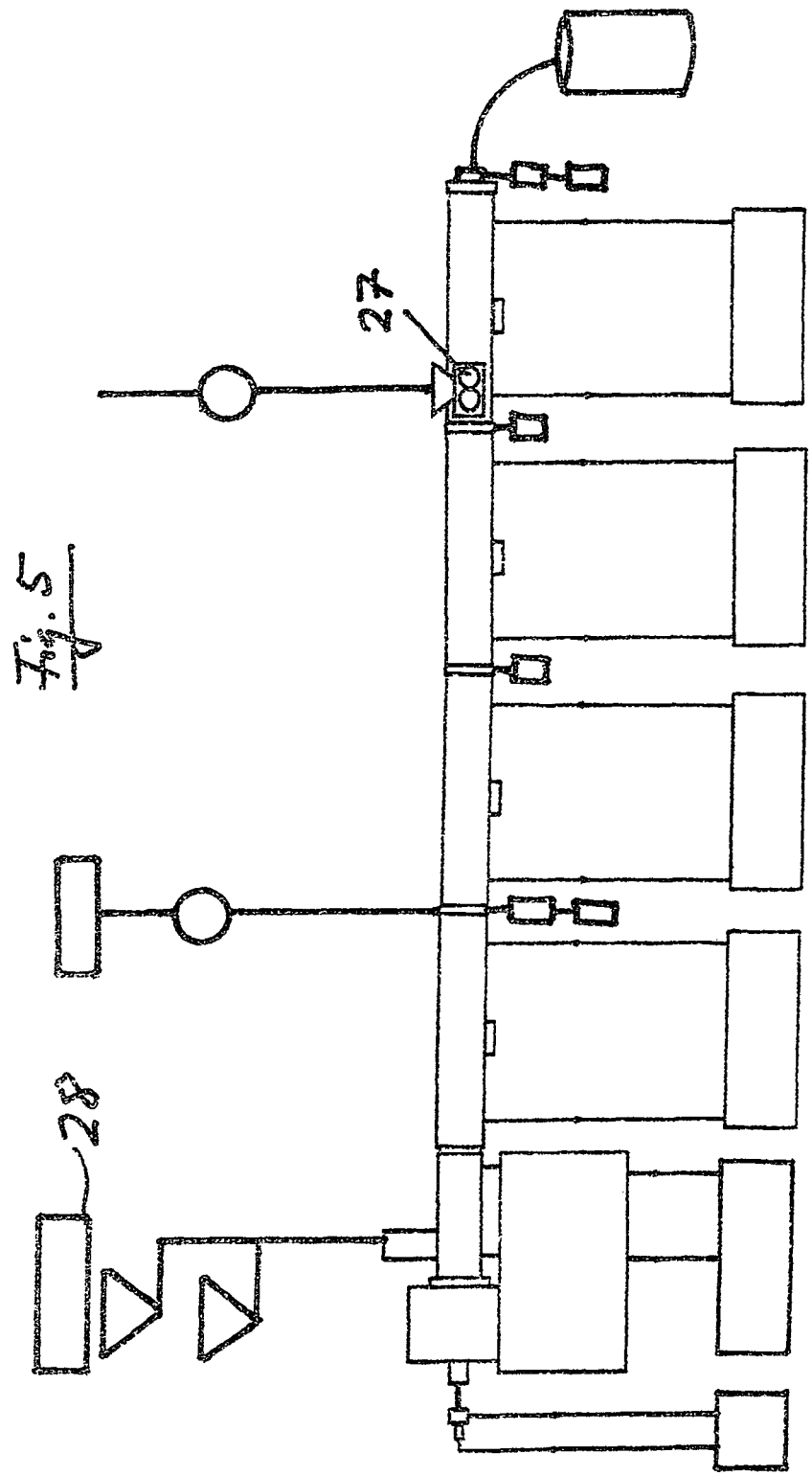

FEEDER MODULE IN PLANETARY ROLLER EXTRUDER DESIGN

TECHNICAL FIELD

The present disclosure relates to a planetary roller extruder module having planetary spindles formed to improve a feed of material from a hopper into the extruder.

BACKGROUND

The following main groups of extruders are generally known: single-screw extruders, twin-screw extruders, and planetary roller extruders.

Single-screw extruders consist of a rotating screw and a surrounding housing. With single-screws, a high pressure build-up and a large conveying effect can be achieved. However, the homogenization and dispersion are weak in the single-screw extruder. Nevertheless, single-screw extruders are still the most used extruders.

Twin-screw extruders consist of two parallel and intermeshing screws and a surrounding housing. With twin-screws, a high pressure build-up and a large conveying effect can be achieved. The mixing effect of the twin-screw extruder is much greater than with a single-screw extruder, but due to the mechanical load in the twin-screw extruder, plastics experience a more or less pronounced change in their molecular chains. There are applications that can accept this. For other applications, the preservation of molecular chains is important. A planetary roller extruder lends itself to those applications.

Planetary screw extruders consist of more parts than a twin-screw extruder, namely a rotating central spindle, a housing with an internally toothing surrounding the central spindle in a distance, and planetary spindles which rotate, like planets, around the central spindle in the void between the central spindle and the internally toothed housing. As far as reference is made in the following to an internal toothing of the housing, this includes a multi-part housing with a liner, which forms the internal toothing of the housing. In the planetary roller extruder, the planetary spindles mesh with both the central spindle and the internally toothed housing. At the same time, the planetary spindles slide, with their end that point in conveying direction, on a stop ring. Planetary roller extruders have an extremely good mixing effect compared to all other extruder types, but a much lower conveying effect.

For a continuous compounding of plastic or plasticizing substances, especially of plastic materials, it has been known for some decades to use planetary roller extruders. Such methods and corresponding planetary roller extruders are described in particular in the following publications: DE19939075A1, CA698518, DE19653790A, DE19638094A1, DE19548136A1, DE1954214A, DE3908415A, DE19939077A, EP1078968A1, EP1067352A, EP854178A1, JP3017176, JP11080690, JP9326731, JP11-216754, JP10-235713, WO2007/0874465A2, WO2004/101627A1, WO2004/101626A1, WO2004/037941A2, EP1056584, PCT/EP99/00968, WO94/11175, U.S. Pat. No. 6,780,271B1, U.S. Pat. No. 7,476,416.

Reference is made to planetary roller extruder sections/modules when an extruder is composed of several sections/modules. In most cases, these are different sections/modules. For years, it has been proven to be advantageous to combine planetary roller extruder sections/modules with sections/modules of a different design. In particular, planetary roller extruder sections/modules are combined with a feed part designed as a single-screw extruder section/module. The raw materials for the extrusion are removed from a feed hopper and pressed into the planetary roller extruder sections/modules. The use of a conventional planetary roller extruder section/module as feed part did not prove successful. The material escaping downward out of the hopper is again pressed out of the feed part by the rotating planetary spindles.

As far as liquid blowing agents or other liquid substances are to be supplied into the planetary roller extruder sections/modules, it has been proven to inject these liquids via injection rings into the line, which are arranged between each two planetary roller extruder sections/modules. It is also known to supply melt via a side-arm extruder or a pump directly into a planetary roller extruder section/module.

Regarding the details and variations of known planetary roller extruders or sections/modules reference is made to the following publications: DE102005007952A1, DE102004061068A1, DE102004038875A1, DE102004048794A1, DE102004048773A1, DE102004048440A1, DE102004046228A1, DE102004044086A1, DE102004044085A1, DE102004038774A1, DE102004034039A1, DE102004032694A1, DE102004026799B4, DE102004023085A1, DE102004004230A1, DE102004002159A1, DE19962886A1, DE19962883A1, DE19962859A1, DE19960494A1, DE19958398A1, DE19956803A1, DE19956802A1, DE19953796A1, DE19953793A1.

In addition to plastics, various other materials are used for the extrusion. These include fillers, dyestuffs, softeners stabilizers and other auxiliaries or additives. Not all substances are well processed by the planets. Partly the material is repulsed by the rotating planets. Partly this is attributed to a lack of sliding capacity. Some substances tend to adhere or, after reaction with other substances, tend to stick in the extruder. In order to avoid or reduce the adhering or sticking, it is known to add lubricants to the extrusion material. On the other hand, there is a wide range of plastics for which lubricants are not suitable. This applies, for example, to adhesives, even if the adhesives are to be processed in the extruder. The compounding of adhesives by means of extruders is described in the following publications: CA698518, DE69937111, DE69808332, DE19939078, DE19939077, DE19939076, DE19939075, DE19939074, DE19939073, DE19824071, DE19806609, DE19730854, DE19638094, DE19819349, DE19749443, DE19653790, DE19548136, DE19534239, DE10334363, DE10137620, DE20130049, DE10059875, DE10050295, DE10036707, DE10036706, DE10036705, DE4308098, DE4111217, DE3908415, DE2719095, DE235613, DE2303366, DE1954214, EP1080865, EP1078968, EP1067352, EP0854178, U.S. Pat. Nos. 6,780,271, 6,179,458, 5,536,462, 4,268,176, 4,176,967, WO2007/874465, WO2004/101627, WO2004/101626, WO220/037941, WO94/11175.

Moreover, EP2098354 discloses a process for the production of a highly cohesive pressure-sensitive adhesive at which planetary roller extruder sections are used. In this case, the raw materials are supplied via a feed part designed as a single-screw. This corresponds to the conventional material supply. There is also a note that the raw materials can be supplied directly between the central spindle and the planetary spindles. At that point, the material supply of solid matters is so difficult that the realization of this proposal is not offhand for an average expert.

Also, DE19856235 shows an extruder with planetary roller extruder sections. In this publication is described in column 2, how raw materials for powder coating production in granular form with appropriate adjustments by means of a hopper can be supplied directly through the housing shell into a planetary roller extruder part. Further details are missing.

If the plastics processed in the extruder are compatible with lubricants, the use of a lubricant has become accepted.

Efforts have been made to reduce the use of lubricants for lubricant-incompatible materials. In addition, an objective of the invention is to operate completely without lubricants, so that even lubricant-incompatible materials could be better processed in the extruder.

The PCT/EP2013/000132 has also set itself the aim of developing another material supply as feed part. For this purpose, a feed part in form of a planetary roller extruder section/module has been used, the planetary spindles of which are at least partially formed as transport spindles in the region of the inlet opening. This formation advantageously allows (apart from the filling level of the raw material in the feed hopper located over the filling opening) a pressure-free entry of the raw material in the filling opening. In addition, the formation of the filling part is also advantageous if the feed part is equipped with a stuffing screw/stuffing device.

Stuffing screws/stuffing devices are described in various publications also in combination with extruders, also in combination with planetary roller extruders. Exemplary, reference is made to DE102007050466, DE102007041486, DE20003297, DE19930970, DE102008058048, DE102007059299, DE102007049505, DE102006054204, DE102006033089, DE102004026599, DE19726415, DE10334363, DE20200601644, DE20200401971, DE10201000253, DE102009060881, DE102009060851, and DE102009060813.

The stuffing screw/stuffing device is used when the raw material intended for the extruder does not exit alone from the feed hopper of the feeding part due to its weight and enters the inlet opening. This is the case, for example, with fibers that are to be mixed with plastic. The stuffing screw/stuffing device then forces the raw material into the inlet opening of the extruder. In case of the stuffing screw, the resistance of all the raw material to the feeding is considerably reduced by the described formation.

SUMMARY

When using a planetary extruder feeding part, a special feeding area is preferably provided on the internal side of the planetary roller extruder section/module. The feeding area is the ring area at the housing shell of the planetary roller extruder section/module, in which there is an opening for the material inlet. The feeding area is equal to the opening plus/minus an alteration of the width of the ring surface of 50%, preferably plus/minus 30%, even more preferably plus/minus 10%, whereby the change of the width of the ring surface—starting from the center of the ring surface—is preferably evenly distributed on both halves of the ring surface, which lie on both sides of the surface of the ring center. For the dimension of the feeding area in direction of rotation, preferably the same is valid as for the width. Optionally, an oversize of the feeding area opposite the opening in the housing shell is also given only in direction of rotation.

In the case of the described planetary roller extruder sections/modules, which are used as feeding parts, the intake effect can be changed by means of planetary spindles. In particular, transport spindles are provided as planetary spindles. In addition, the transport spindles can be supplemented by a flattening of the internal toothing of the housing. The flattening also has advantages regardless of the use of planetary spindles, which are at least partially designed as transport spindles.

The flattening takes place in the area which adjoins the inlet opening in the direction of rotation of the central spindle. At sufficient stability of the planetary spindles, the support of the planetary spindles, which partly falls away due to the flattening, has no effect on the planetary spindles. The planetary spindles are held sufficiently at their ends between the central spindle and the internal toothing of the housing, because the internal toothing of the housing there has full teeth. The additional bending load of the planetary spindles resulting from the omitted support is easily sustained by conventional planetary spindles.

In principle, the flattening in direction of rotation of the central spindle can be uniform. However, it is preferred that the flattening decreases in direction of rotation of the central spindle. This results in a funnel-shaped enlargement of the void between the internal toothing of the housing and the central spindle. This enlargement reduces the resistance of the raw material when it is fed into the extruder. The funnel shape directs the raw material in a favorable way between the planetary roller parts of the feeding part. The flattening can be done down to the tooth root. Preferable the tooth depth will be reduced by a maximum of 90%, more preferably by a maximum of 80%.

In spite of the flattening, all the raw material which gets into the space of the previous tooth gaps is still displaced by the teeth of the rotating planetary spindles. In order to avoid that a deposit occurs on the flattenings, the flattened teeth can be provided with new, less inclined tooth flanks so that there new teeth with a preferably rounded new tooth point can be created so that the raw material displaced from the previous tooth root thus pushes away all raw material adhering at the new tooth flanks.

Such tooth changes can be made at the toothing, inter alia, with electrically operated eroding devices. For the internal toothing, the erosion is of particular advantage. Optionally, the flattening of conventionally toothed housings or housing liners takes place with a special electrode. This is more economical for small quantities than the production of the internal toothing and the flattening in a common erosion process. For larger quantities, another economic situation may occur.

During the erosion process for small quantities, an electrode is used which is adapted to the desired new flattened tooth shape, taking into account a gap necessary for the erosion process and which is immersed with the housing in an erosion bath. Thereby, the electrode is brought closely over the toothing to be flattened and the work piece is supplied with current so that sparks emerge from the housing and material liquefies on the surface and is carried away by the sparks.

With increasing deformation of the toothing to be flattened, the electrode is tracked so that a desired, small distance is maintained.

The described enlargement of the space by flattening of the internal toothing of the housing is dependent on the extent to which the flattening extends in the direction of rotation of the central spindle and to what extent the flattening extends in the axial direction of the central spindle.

Preferably, the measure of the flattening is at least 1/10, more preferably at least 1/5, and most preferably at least 1/2 of the circumference of the pitch circle of the internal toothing of the housing.

The extent of the flattening in the axial direction of the central spindle is referred to as width. The width is at the most 30% greater or smaller than the opening width of the inlet opening, preferably at the most 20% greater or smaller than the opening width of the inlet opening and even more preferably at the most 10% greater or smaller than the opening width of the inlet opening. Highly preferred is the width of the flattening the equal to the opening of the inlet opening.

So-called transport spindles arise when at least at one conventionally toothed planetary spindle at least one tooth is removed. Optionally, more teeth can be removed. Preferably, at least each 3 teeth remain evenly distributed on the circumference of the planetary spindles. Also, every fourth or every third or every second tooth can be removed. Also, all teeth except one tooth can be removed. If more than one tooth remains, the teeth are preferably evenly distributed on the circumference of the spindles. This results in a reduced tooth configuration in contrast to non-reduced tooth configuration. The removal of the teeth is preferably carried out down to the tooth root. Also conceivable is a further material preparation, as well as only a partial removal of the teeth.

Alternatively, transport spindles are fabricated from the beginning in that way, that they arise in that shape which results when single or several teeth are removed from conventional spindles.

Due to the entire or partial removal of certain teeth while other teeth remain in place, a planetary spindle with a higher conveying effect arises.

It has been shown that transport spindles, contrary to other planetary spindles, process well the material running from a feed hopper into the planetary roller extruder section/module. The number of the remaining teeth of the transport spindles is optionally at the most 4, preferably 3, more preferably 2 and most preferably 1. The "complete or partial" formation of the planetary spindles as transport spindles means that
 a. planetary spindles outside the area of the inlet opening are equipped with a different toothing
 and/or
 b. transport spindles in the area of the inlet opening are combined with planetary spindles of another toothing.

Other toothings refers to, for example, conventional toothing or transversal mixing planetary spindles or nap spindles. The transversal toothing and/or the nap toothing are intended on the planetary roller extruder section/module in conveying direction.

The known transversal toothing preferably originates from a conventional toothing in that way, that annular grooves are worked into the planetary spindles in axial distances. The annular grooves are deliberately chosen, so that the teeth run out at the end like a wave and rise like a wave at the beginning, whereby the teeth of the beginning immediately merge into the end. This results in round teeth.

The nap toothing preferably also originates from the conventional toothing. The conventional toothing of planetary spindles is on the one hand characterized by a cross section, as it is shown by the meshing teeth of a gear wheel of a gear box. On the other hand, the teeth do not run straightly, but spindle-shaped or like the threads of a screw thread along the circumference. The threads are also cut in this form into the raw material of the planetary spindles, e.g. lathed or milled. For the threads, a distinction is made between left-handed thread and right-handed thread. There are also multi-thread threads. The same distinction applies for extruder spindles.

A nap toothing arises when e.g. in a right-handed toothing a left-handed groove similar to a thread is incorporated. The threads of the planetary spindles are interrupted by the groove. The groove may have the same or a different pitch (less or greater) than the toothing of the spindles. The pitch of the groove preferably differs at most by 50% from the pitch of the toothing.

It is an advantage if the planetary spindles have outside of the inlet area a conventional toothing at the end facing away from the conveying direction. There, the larger conveying effect of the conventional toothing is used in order to prevent entering raw material from spreading against the conveying direction of the extruder.

However, a conventional toothing can also be provided outside the inlet area at the planetary roller extruder section/module in conveying direction. As stated above, planetary spindles of a planetary roller extruder section/module serving as a feed part which are designed as transport spindles, can be combined with differently designed planetary spindles. In other words, the planetary spindle set (total of all planetary spindles) of a planetary roller extruder section/module serving as feed part can optionally also consist of differently toothed planetary spindles. Preferably, the portion of the planetary spindles with transport spindle toothing is at least 50%, more preferably at least 70% and even more preferably at least 90% of the planetary spindle set.

In case of partial use of transport spindles for the planetary spindle set, the planetary spindles with transport spindle toothing are preferably distributed equally in the planetary spindle set.

At a planetary spindle set equipped entirely with transport spindles, the number of teeth on the transport spindles is preferably selected in that way that at least within 10 revolution of the planetary spindles around the central spindle one planetary spindle tooth meshes in every tooth space of the toothing of the central spindle and in every tooth space of the internal toothing of the surrounding housing. Preferably, this meshing occurs within at least 7 revolutions of the planetary spindles around the central spindle, even more preferably within at least 4 revolutions of the planetary spindles around the central spindle, and most preferably within 1 revolution of the planetary spindles around the central spindle. This meshing causes a cleaning of the toothing.

The meshing of the tooth can be controlled/designed, for example, by lubricating a molten, colored material at room temperature with sufficient adherence to planetary spindles, central spindle and internal toothing of the housing in their tooth spaces. Then it can be clarified after how many revolutions of the planetary spindles around the central spindle a desired tooth meshing has occurred. This happens, for example, after one revolution or 4 revolutions or 7 revolutions or 10 revolutions of the planetary spindles around the central spindle by opening the feed part.

In the process, the rotation of the planetary spindles around the central spindle is in a fixed relation to the rotation of the central spindle. For the above control/design, the central spindle of the feed part can be easily turned by hand when the feed part is detached from the remaining extruder sections/modules. Thereby, the movement of the central spindle can be simulated with a sample piece of the central spindle. If the desired tooth meshing is not achieved within the required number of revolutions of the planetary spindles around the central spindle, the planetary spindles can be replaced by other planetary spindles or additional planetary spindles can be used. The other planetary spindles can have more teeth than transport spindles and/or have differently arranged teeth. Optionally, the replacement of one transport spindle against a conventionally toothed planetary spindle is sufficient in order to ensure that at each revolution of the planets a meshing in each tooth root at the central spindle and at the internally toothed housing will take place.

In contrast to the described feed part, a conventional feed screw in a feed part has no comparable cleaning. It is imperative for the screw that the successive raw material pushes out the previous material. This is practically not to control. The raw material flows to where the least resistance is. It is not possible to ensure that the same resistance occurs throughout the passage space left open by the screw in the feed part. Even the slightest caking/adhesions can have a lasting negative impact on the flow behavior. Without engagement of the operators, there is hardly any cleaning. In a planetary roller extruder, on the other hand, it is inevitable that a cleaning occurs due to the respective meshing of the tooth. This can be referred to as self-cleaning.

For the processing of various plastics, it is of great advantage to temper the feed part. Indeed, a heating/cooling of the feed screw on conventional feed parts is known. However, the heating/cooling starts at the known feed parts in conveying direction behind the inlet opening. Preferably, however, the heating/cooling starts already at the inlet opening. Preferably, the feed part is divided into at least two tempering sections and/or is of short length. The short length refers to the length of the feed part behind the inlet opening. The short length is less than or equal to 0.5*D, whereby D is the pitch diameter of the internal toothing of the housing. At a length of the feed part of more than 2*D (for example 3*D or 4*D), a temperature control in sections is preferably provided, in which the first heating-cooling section in conveying direction has a length which is equal to the length of a short feed part (less or equal to 0.5*D). Each heating-cooling section is equipped with a guide for the heating-cooling means. The guidance for the heating-cooling means is carried out as in other known planetary roller extruder sections/modules. There, the heating-cooling channels will be incorporated at the inside area of the housing and/or at the outside area of the liner before assembly of the liner supporting the internal toothing in the housing. The channels proceed like threads on the inside area of the housing and/or at the outside area of the liner located in the housing. At the one end of the threads the heating-cooling agent enters and at the other end it comes out. The channels are closed by the liner during its assembly. In the housing shell, borings are preceding to the heating-cooling channels. At the borings there are connected feed lines/discharge lines for the heating-cooling agents. The heating-cooling agent is mostly water, often oil. The heating-cooling agent comes from a heating-cooling aggregate located outside of the line, in which it is brought to the desired temperature and supplied to the belonging heating-cooling section. In the heating-cooling section, the heating-cooling agent releases heat as needed or the heating-cooling agent absorbs heat as needed. The streaming out heating-cooling agent is fed to the heating-cooling aggregate located outside the line for re-loading with heat or for cooling.

The feed part designed as a planetary roller extruder section/module preferably has a housing extending over the entire length of the feed part with above described liner and incorporated cooling channels. Thereby, the cooling channels can proceed continuously from one end of the housing to the other end of the housing in order to facilitate the production. Before installing the liner, the ends of the channels can be closed with rings which are positioned in corresponding grooves of the ends of the housing. To divide the entire cooling section into several sections, plugs can be placed in each channel between two section each before inserting the liner. The borings described above lead to the channels for the heating-cooling agents. Thereby, of the borings, the ones lead to the end of each channel and the others to the beginning of each channel.

The application of the described feed parts has advantages for various materials. These include amongst others elastomers, polyurethanes, adhesives, chewing gum.

Elastomers and comparable materials have a significant importance in the economy/technology. Everywhere, where plastic has to experience a particular strong deformation and shall nevertheless take to original shape after a release, it is thought about elastomers and the like rubbery-elastic plastics (caoutchouc). Plastics consist of large molecular chains. The high elasticity of the elastomers is given by a phenomenon in the behavior of the molecular chains. At a tensile stress, the molecular chains being originally a ball, arrange themselves differently, preferably in parallel, and the molecular chains expand.

For the desired deformation it is important that the molecular chains do not slide against each other. The sliding can be prevented by cross linking the molecular chains. The amount of crosslinking influences the deformation. Low crosslinking results in a soft plastic. Strong crosslinking creates a hard plastic.

There are different cross-linking agents. Depending on the plastic, a selection of cross-linking agents takes place. Sulphur is one of the commonly used crosslinking agents. Sulphur will act as a crosslinking agent at appropriate heating of the plastic. Other crosslinking agents are not affected by the heat effect or the effect of the crosslinking agent may also depend on other circumstances.

The elastomers include, for example:
acrylonitrile-butadiene-caoutchouc (NBR)
acrylonitrile/butadiene/acrylate (A/B/A)
acrylonitrile/chlorinated polyethylene/styrol (A/PE-C/S)
acrylonitrile/methyl methacrylate (A/MMA)
butadiene-caoutchouc (BR)
butyl rubber (HR) (IRR)
chloroprene rubber (CR)
ethylene-ethylacrylate-copolymer (E/EA)
ethylene-propylene-copolymer (EPM)
ethylene-propylene-diene-rubber (EPDM)
ethylene vinyl acetate (EVA)
fluororubber (FPM or FKM)
isoprene rubber (IR)
natural rubber (NR)
polybutadiene rubber (BR)
polyethylene resins
polyisobutylene (PIB)
polypropylene resins
polyvinyl butyral (PVB)
silicone rubber (Q or SIR)
styrol-isoprene-styrol-block copolymer (SIS)
styrol-butadiene-rubber (SBR)
styrol-butadiene-styrol (SBS)
thermoplastic polyurethane (TPU or TPE-U)
vinyl chloride/ethylene (VC/E)
vinyl chloride/ethylene/methacrylate (VC/E/MA)

At elastomers, the risk of sticking and caking is particularly great when crosslinking agents are drawn in together with other material via the feed part, which respond to heating. Such elastomers are known, for example, from DE60124269, DE3738335. Then, any sticking and caking leads to unforeseen heating to the unforeseen start of the crosslinking and to a worse material quality. By the described feed part, the feared difficulties caused by sticking and caking in the feed part, can be avoided.

In the case of polyurethanes, it is important to combine two reaction components in the correct ratio. It is known to combine the reaction components by means of an extruder. This is, for example, described in DD141975, DE1964834, U.S. Pat. No. 3,233,025, DE2059570, and DE2447368. Minor irregularities in the material feed already affect the blend. Also that can be counteracted with the described feed part in the feed area.

The processing of adhesives in the extruder is described, for example, in EP 1167017. By using the described feed part, the processing of adhesives can be substantially facilitated.

The processing of chewing gum in the extruder is known. The heat sensitive base compound contains lecithin, softener, syrup, sugar, oils, fragrances and elastomers. Among these, there are strongly adhesive components tending to caking. Corresponding references can be found in DE69829695, U.S. Pat. Nos. 5,135,760, 5,045,325, and 4,555,366. Also this production can be substantially facilitated by means of the described feed part.

The described feed part can be combined with other planetary roller extruder sections/modules. The essential components of the other planetary roller extruder section are again the central spindle, rotating planetary spindles, and an internally toothed housing as well as a stop ring for the planetary spindles. The function of these parts is the same as stated regarding planetary roller extruders at the beginning. The planetary spindles can be of different design. Preferably, the planetary spindles have a conventional toothing und/or a transversal mixing spindle toothing and/or a transport spindle toothing.

The conventional toothing is an involute toothing. The involute determines the tooth shape in the cross section. Apart from that, the teeth on the circumference of the planetary spindles are arranged like the thread teeth of the external toothing of a thread rod.

The transversal toothing originates in the above described form from a conventional toothing. Also the nap toothing originates from a conventional toothing in the above described form. Also the transport toothing originates from a conventional toothing in the above described form.

Thereby, the different types of toothing (conventional/transversal/nap/transport) can be restricted to individual planetary roller parts. The different types of toothing (conventional/transversal/nap/transport) can also be provided in several or all planetary roller parts. The different types of toothing (conventional/transversal/nap/transport) can also occur all together or in two or three different types of toothing together on the planetary spindles. The above mentioned variations in the toothing can concern all planetary spindles or only a part of the planetary spindles of a planetary roller extruder section/module.

It is favorable to arrange the conventionally toothed part of the planetary spindles in conveying direction of the extruder at the rear end (at the discharge end of the planetary spindles/the end in conveying direction) in order to build up there a conveying pressure which facilitates the transition of the granulate into the further extruder range.

Optionally, especially toothed planetary spindles can alternate with differently toothed planetary spindles.

Optionally, individual, especially toothed planetary spindles can be arranged between a plurality of differently toothed planetary spindles. Thereby it is favorable, if always at least two identically toothed planetary spindles occur in a planetary spindle set of a planetary roller extruder section/module, which are evenly distributed in the set.

As far as the nap toothing/transversal toothing is provided in several corresponding planetary roller parts (internal toothing of the housing, planetary spindles and central spindle) the nap toothing can be arranged in that way that the interruptions of the toothing in a planetary roller part are aligned with the interruptions in the corresponding planetary roller part or offset in relation to these interruptions. The offset may have a dimension which is equal to a fraction of the tooth gap between two teeth or a multiple of the tooth gap between two teeth, whereby a multiple may also be a number less than 2. Due to the interruption of the teeth, openings arise in which the extrusion material can flow.

Preferably, the further planetary roller sections/modules have a length of at most 1200 mm at a diameter of up to 100 mm in the toothing of the planetary roller extruder housing, even more preferred of at most 1000 mm. Other diameters of the toothing of the planetary roller extruder housing result in correspondingly longer or shorter maximum lengths.

During extrusion, energy is introduced into the extruder or into the extruder section to a considerable extent, which shows up in the granulate as heat. If the granulate already reaches the planetary roller extruder or planetary roller extruder section at a considerable temperature, it may be necessary to dissipate the generated heat by cooling.

If the granulate does not yet have sufficient temperature when it enters the planetary roller extruder or the extruder section, the above cooling will not occur. If necessary, heat may be supplied.

For the cooling and/or heating, conventional heating-cooling devices on the planetary roller extruders are sufficient. It is customary to design the housing double-shelled (as described above for the described feed part with housing and inside liner) and to guide the heating-cooling agent through the clear spacing. Is also common to equip the central spindle with channels, through which heating-cooling agents are carried. The usual heating-cooling agent is water or oil being used for heating or cooling.

Regarding the planetary spindles which are designed as transport spindles, the following may be of advantage: The teeth at the existing planetary spindles can be removed later. As far as stockpiling of planetary spindles takes place and as far as a tempering or hardening or other treatment is provided to increase the wear resistance of the tooth surfaces, the planetary spindles are preferably stored without the surface treatment so that in retrospect a simple machining of the planetary spindles, e.g. by milling, is possible. The treatment of the tooth surfaces takes place after the machining.

Surprisingly, the removal of teeth does not affect the smooth running of the planetary spindles because the teeth proceed like screws/threads on the surface of the planetary spindles. At adequate length of the spindles and corresponding pitch, the spiral or thread-type proceeding teeth wind around the spindles so frequently that the planetary spindles between the central spindle and the surrounding housing are guided and fixed securely. At a planetary spindle at which every second tooth has been removed, is preferably provided a. at a diameter of the planetary roller housing (with regard to the pitch diameter of the internal toothing of the housing) smaller than 160 mm, a machined minimum spindle length of 200 mm, preferably of at least 300 mm and further preferred a spindle length of at least 400 mm, and a machined maximum spindle length is intended up to 1500 mm, preferably up to 1200 mm und most preferred up to 900 mm for a planetary spindle, and b. at a diameter of a planetary roller housing (with regard to the pitch diameter of the internal toothing of the housing) of 160 mm and more a machined minimum spindle length of at least 400 mm, preferably of at least 800 mm and most preferred a spindle length of at least 1200 mm and a maximum spindle length up to 3000 mm, preferably up to 2500 mm und even more preferred up to 2000 mm.

The above mentioned minimum spindle length refers to the toothing at the planetary spindle. The minimum spindle length preferably does not include the toothing, which arises in the above described running down of the milling tool and/or when starting the milling tool to target milling depth, if the planetary spindle length is longer than the toothing lengths of the planetary spindle.

The machining (removal of teeth) of the planetary spindles can be applied to all known tooth modules, in particular to the common modules 1.5 to 12 or beyond up to 20. The tooth modules are to be distinguished from the above mentioned planetary roller parts/modules. The tooth modules indicate the size of the teeth.

Preferably, the extruder sections/modules designed as a planetary roller extruder are arranged in one stage of the extrusion line. Optionally, it can also be a multi-stage extrusion line. At two stages, this is called a tandem line with a primary extruder and a secondary extruder. At more stages one speaks of a cascade line. The multi-stage arrangement of an extrusion line is used to execute between the stages a degassing of the extrusion material and/or to drive the individual stages independently.

The extrusion line mostly includes an extruder section provided at the end, in which the extrusion material is brought to discharge temperature.

The planetary roller sections/modules are assembled with other sections/module to the desired extruder. Thereby it is customary to provide for all successively arranged module of one stage of an extrusion line a common central spindle.

The modular concept is comparable to a modular construction system and is usually very economical. The different planetary parts (central spindle/planetary spindles/internal toothing) of a section/module have regularly the same tooth module.

Optionally, the teeth are not removed subsequently, but a manufacturing takes place, in which the planetary spindles are immediately brought into the shape that occurs after the above described tooth removal. At first it is important to understand how the teeth arise with conventional toothing. Widely used is the production by milling and grinding. For this, the contour of the toothing is determined and the milling tool is moved along the contour. The milling tool works relative rough. Therefore, a fine machining is common afterwards, for example by grinding at externally toothed parts or by honing or eroding at internally toothed parts. Also manufacturing processes for gear parts are known, such as casting and sintering. To the manufacturing processes also belong forging, compression molding, drawing, rolling and punching. Milling is part of machining. Other machining processes are, for example, planning, pushing, clearing, shaving, grinding, honing.

All processes for producing the toothing have in common that the follow they defined contour of the toothing. At normal toothing, one tooth changes with a tooth gap. The distance between two adjacent teeth of a part is the same.

When defining the contour, it all depends on the toothing. The toothing follows the general knowledge of the gear technology. Distinction is made between different basic forms of toothing: involute toothing as usual toothing, cycloidal toothing and lantern toothing. In addition, there are various special forms.

At planetary roller extruders, the involute toothing has prevailed. The involute toothing with full tooth trimming is referred to below as conventional toothing. In case of the involute toothing, the flanks of the teeth of the gear wheel are formed by involutes. One can imagine the involutes, if one imagines the base circle of the gear as a massive cylinder around which a thread is wound. If this thread is unwound, the tightly spanned final point of the thread describes the figure of an involute. All points on the thread, which have the integer multiple distance from the final point, are thus moving on the involute of anther tooth. The involute toothings have the following advantages:

The flanks of two meshing gear wheels are always in contact, and in these points of contact they always have approximately the same speed. This ensures that the transmission of the rotary motion takes place with low friction. At the same time, the involute toothing allows a constant transmission of torques due to a constant transmission.

It is insensitive to the misalignment of the axles of the gear wheels (center distance independency).

It is easy to manufacture with standardized straight-line tools.

At the same geometry of the tools, gear wheels with different number of teeth and different profile displacement are freely combinable.

In the case of planetary gearboxes efforts are made—like with other gears—to work with as small clearances as possible between the gearbox parts. The clearance can be taken into account when defining the contour. At planetary roller extruders, a much greater clearance is usually provided. Also this clearance can be taken into account when defining the tooth contour.

With conventional toothing, a tooth follows a tooth gap and a tooth gap follows a tooth, whereby the teeth and the tooth gaps are the same. As the teeth engage in the tooth gaps and the intermeshing/engaging gear parts should have the same toothing, the tooth gaps include a mirror-inverted image of the teeth.

When designing the toothing, however, the tooth gaps for the planetary spindles with reduced toothing are different from the conventional toothing. At the above described production of the toothing, individual or several teeth are removed from the existing gear parts. Alternatively, individual or several teeth will be already removed at determination of the tooth contour. Then the production will be executed as described above for the determined tooth contour. That means, in case of using a milling tool, the milling tool follows the previously defined new contour with larger tooth gaps. The same applies to other tools for the production of the previously defined new contour.

It is favorable if the number of teeth of the internal toothing of the housing (liner toothing), planetary spindles and central spindle is chosen in that way that the central spindle and the internal toothing of the housing (liner toothing) have an even number of teeth and the planetary spindles have an odd number of teeth. Then the melt in every tooth gap between two teeth is displaced by the teeth of other parts of the planetary roller extruder that enter into the gap. The same conditions are obtained with odd numbers of teeth on the central spindle and internal toothing of the housing and even number of teeth on the planetary spindles.

The same result can be achieved by irregular removal of the tooth trimming during production of the transport spindles, for example that not regularly every second tooth is removed, but once or several times another tooth, for example, every third tooth or, for example, two teeth originally standing side by side remain untouched. This means that the processing then takes place at different intervals. Thereby, it may be sufficient that one distance is differs from the other distances. Also several distances can be different.

The same result can also be achieved by combining the planetary spindles machined in the described manner with unmachined planetary spindles or by combining differently machined planetary spindles.

The transport spindles and the corresponding state of the art are described in DE102006033089A1, EP1844917A2, DE2702390A, EP1833101A1, DE10142890A1, U.S. Pat. No. 4,981,711, GB2175513A, U.S. Pat. No. 5,947,593, and DE2719095.

Every planetary roller extruder has a maximum planetary spindle set. This is the maximum number of planetary spindles which fit between the internal toothing of the surrounding housing and the central spindle without hindering each other from rotating. The maximum planetary spindle set depends on the respective toothing module. While the planetary roller extruder module is an extruder section, the toothing module is a calculation factor/construction parameter that determines the form of the teeth and the tooth gaps.

By choosing in comparison to the maximum planetary spindle set a lower planetary spindle set, then, in addition to the use of transport spindles, a reduction of the energy input into the raw material in the extruder can take place. Preferably, in comparison to the maximum planetary spindle set, at least a reduction of the number of planetary spindles by one, optionally also by at least two or at least three is intended.

Optionally, multi-part planetary spindles are provided, namely with a separately machined part and with a separately produced rest part. The rest part can be a nap toothing part or a conventionally toothed part or another part. Both parts are simultaneously equipped with a central boring for an anchor, by which the two parts are tensed up together. This results in multipart planetary spindles which have a change of toothing over their length, this means, are changing from one toothing to another toothing.

Multiple-part spindles can have advantages during the production of the toothing by producing separately the parts with different toothing. Then the tools do not have to follow the tooth change. In connection with a desired sudden change of the toothing, this procedure offers a good way to proceed.

On the other hand, also a slow change from one toothing to the other can procedurally be of advantage. A slow transition from an above described toothing to a conventional toothing occurs, for example, when a milling tool is used in that way, that the milling tool used for the subsequent tooth removal is moved slowly out of the material of the planetary spindle.

The multi-part planetary spindles can also have a multiple change of toothing.

Also one-piece planetary spindly can be considered, which have over their length in the toothing one or several changes of toothing.

For every change of the toothing, the explanations regarding the subsequent removal of teeth und the previous definition of the tooth contour apply accordingly.

Depending on the extrusion material also a degassing may be required. Concerning the details, for example, it is referred to the following degassing operations: DE102004061185A1, DE102004060966A1, DE102004053929A1, DE1020040050058A1, DE102004004237A1, DE69908565T2, DE69827497T2, DE69807708T2, DE69725985T2, DE69715781T2, DE69715082T2, DE69711597T2, DE69710878T2, DE69709015T2, DE69707763T2, DE69630762T2, DE69628188T2, DE69622375T2, DE69428309T2, DE69427539T2, DE69419146T2, DE69312852T2, DE69312246T2, DE69306874T2, DE69207369T2, DE68928567T2, DE68915788T3, DE60206271T2, DE60012108T2, DE19956483A1, DE19954313A1, DE10257377A1, DE10356821A1, DE10354546A1, DE10354379A1, DE10352444A1, DE10352440A1, DE10352439A1, DE10352432A1, DE10352431A1, DE10352430A1, DE10351463A1, DE10349144A1, DE10345043A1, DE10343964A1, DE10342822A1, DE10340977B4, DE10340976B4, DE10333927A1.

Moreover, it is advantageous if the housing has a rounding at the transition of the inlet opening into the toothing of the housing. Preferably, the rounding has a radius which is at least equal to ¼ of the tooth depth, more preferably at least equal to ½ of the tooth depth of the toothing of the housing.

Optionally, the raw material with regard to the center of the planetary roller extruder is also fed eccentrically into the planetary roller extruder. The misalignment takes place in the direction of rotation of the central spindle of the planetary roller extruder. Thereby, the center axis of the material feed runs past at a distance at the center axis of the planetary roller extruder. Preferably, the distance is greater than a quarter of the pitch diameter of the toothing in the extruder housing or the toothing in the internally toothed liner of the housing. Even more preferably, the distance is greater than half the pitch diameter of the toothing in the extruder housing or the toothing in the internally toothed liner of the housing. Most preferably is the distance greater than half the diameter of the root circle of the toothing of the central spindle and smaller than half the root circle of the toothing in the extruder housing or the toothing in the internally toothed liner of the housing.

It is advantageous if the diameter of the material supply is smaller than the diameter of the root circle of the internal toothing of the extruder housing or the internal toothing of the liner in the housing. Insofar as at an eccentricity of the material supply, the material supply projects laterally over the space in which der material is processed in the planetary roller extruder, a bevel is provided in the transition from the material supply to the housing of the planetary roller extruder. Due to the bevel, the material supply tapers at the transition of the material supply to the extrude housing.

Favorable conditions arise in the case when the bevel in the cross section of the extruder housing is approximately on a tangent at the pitch diameter of the internal toothing of the extruder housing or the internally toothed liner of the housing, when the cut runs also in longitudinal direction of the material supply through its center. Approximately means that the bevel maximally deviates by a measure from the tangent, which is equal to the diameter of the planetary spindles belonging to the planetary roller extruder, preferably maximal equal to half the diameter of the corresponding planetary spindles and most preferably equal to one quarter of the diameter of the corresponding planetary spindles. Thereby, the bevel includes with the horizontal through the center axis of the planetary roller an angle of at least 30 degrees, even more preferably an angle of at least 45 degrees and most preferably an angle of at least 60 degrees. Thereby, the material supply into the planetary roller extruder is improved.

Similar results can be achieved if instead of a straight running bevel, a bevel running on a curved track is provided.

The material supply described is particularly suitable for modularly constructed planetary roller extruders. Then a planetary roller extruder module can be arranged with the material supply at any desired location. The desired location does not have to be calculated in advance. It is also possible to find the right place in an empirical way by arranging the material feed in the second or third planetary roller extruder module. This is done by arranging the planetary roller extruder module equipped with the material supply as a second or third or fourth module.

Optionally, the planetary roller extruder module is used in manifold designs or in combination with a conventional feed part which reproduces a single screw extruder and is equipped, for example, with a feed hopper. In this way, materials can be supplied at different places. Thus, also materials can be processed which are not allowed to be mixed together into the blend or must be added to the blend in succession and, if necessary, at time intervals.

In addition, materials difficult to process, such as solid mattes with a tendency of sticking and caking or solid matters with a tendency of decomposing can be added to the blend as late as possible. Solid matters can be supplied together to the blend and optionally also with liquids or with melts.

In most cases, an exact dosing is of advantage. The dosing can take place volumetrically or gravimetrically. The solid matters can be supplied into the extruder pressureless or by means of a stuffing device by force.

In the form described above, planetary spindles can be wholly or partly formed by transport spindles or combined with differently designed planetary spindles. For temperature-sensitive materials, a heating-cooling of the connection and/or other feed parts can be provided.

The technology can be, for example, of advantage when using the extruder in chemical processes, in the food industry or in the plastics industry.

The invention is based on a recognition that the feed capacity of a feed part in the design of a planetary roller extruder section/planetary roller extruder module depends on the grain size of the raw material. The finer the raw material, the more the feed rate decreases. With decreasing intake capacity, the performance potential of the extruder for plasticizing/mixing/homogenizing/cooling and other tasks is less and less utilized. In case of fine-grained or even finer material, the throughput of a planetary roller extruder can easily be reduced by 30% to 40% in caparison with the processing of granular material due to the difficult intake.

Therefore, it is a goal of the invention to improve the feed performance of a feed part in the design of a planetary roller extruder section/planetary roller extruder module for the application of fine/fine-grained and especially of even finer materials. This goal is achieved by the features of the independent claim. The dependent claims describe preferred embodiments.

The improvement is based on the above described transport spindle when using a feed part in the design of a planetary roller extruder. According to the invention, the transport spindles used are totally or partly staged. At least two stages are intended. Also three or four stages or more stages may be used.

The stages are created in that different numbers of teeth are provided in each stage. The fewest teeth are provided in the inlet area of the feed part. In the next (second) stage in transport direction of the raw material there is at least one tooth more than in the inlet area provided at the transport spindles; in the next but one (third) stage at least two teeth more than provided in the inlet area; in the fourth stage at least three teeth more as provided in the inlet area.

With increasing tooth count in the following stages, the feeding effect of the planetary spindles increases. This means that in the area of the inlet opening the raw material is first given a particularly good opportunity to get between the local teeth of the planetary spindles. In downstream stages, the raw material experiences an increasing feed effect. On this way, the material throughput in the extruder during processing of fine/fine-grained and even finer raw materials can be increased again.

The stages preferably have the same length. Thereby, the length of the first stage is determined by the openings width of the inlet. In case of doubt, the stage length is equal to the opening width of the inlet. Deviations may be appropriate in the form described above.

The stages can also have different lengths, shorter or longer lengths. For example, the length of the second stage may be shorter than the length of the first stage; the length of the third stage can be shorter than the length of the second stage; the length of the fourth stage can be shorter than the length of the third stage.

From one stage to the other stage, there is preferably no abrupt transition, but provided is a smooth transition. The smooth transition is characterized by a declining/running down or slow increase of the additional teeth of the successive stage. The increasing or declining of the teeth takes place on a tooth length which is at least equal to 0.5 times, preferably at least equal to 1 time of the tooth depth.

Moreover, it is advantageous if the planetary spindles designed as transport spindles protrude with a part over the inlet area in direction of the drive of the extruder. This part is fully toothed. This has the advantage of guiding the planetary spindles at this end and of a sealing against raw material that wants to spread in the direction of the drive. In the following, this part of the planetary spindles is referred to as the guide lengths. The guide length of the planetary spindles is on the drive side of the extruder at least equal to the outside diameter of the planetary spindles. The guide length can also be 2 to 3 times the outside diameter or equal 3 to 4 times the outside diameter of the planetary spindle. The planetary spindles can also be provided at the opposite end with a full-toothing acting as a guide length. This guide length is preferably at least equal to 0.5 times to 1 time the outer diameter of the planetary spindles. This guide length is preferably always a fraction of the length of the drive-side guide length. For example, this guide length may be 0.2 times to 0.7 times the drive-side guide length. Preferably, this guide length is 0.3 to 0.4 times the drive-side guide length.

The advantages of the staged planetary spindles are evident in all fine/fine-grained and even finer raw materials. In addition to the raw materials mentioned above, this also includes powdered material, including PVC or ground scrap rubber.

In addition, the staged transport spindles may also be important at other points than in the feed part of a planetary roller extruder, irrespective of the fineness of grain of the raw material. Such use can be, for example, in the processing of PET, in particular the drying of raw material.

BRIEF DESCRIPTION OF THE DRAWINGS

FIG. 2 is a schematic illustration of a planetary spindle having two toothing sections.

FIG. 3 is a schematic illustration of a planetary spindle having a first type of toothing.

FIG. 4 is a schematic illustration of a planetary spindle having a second type of toothing.

FIG. 5 is a schematic illustration of an alternative extruder having multiple sections.

DETAILED DESCRIPTION

Figure 1:
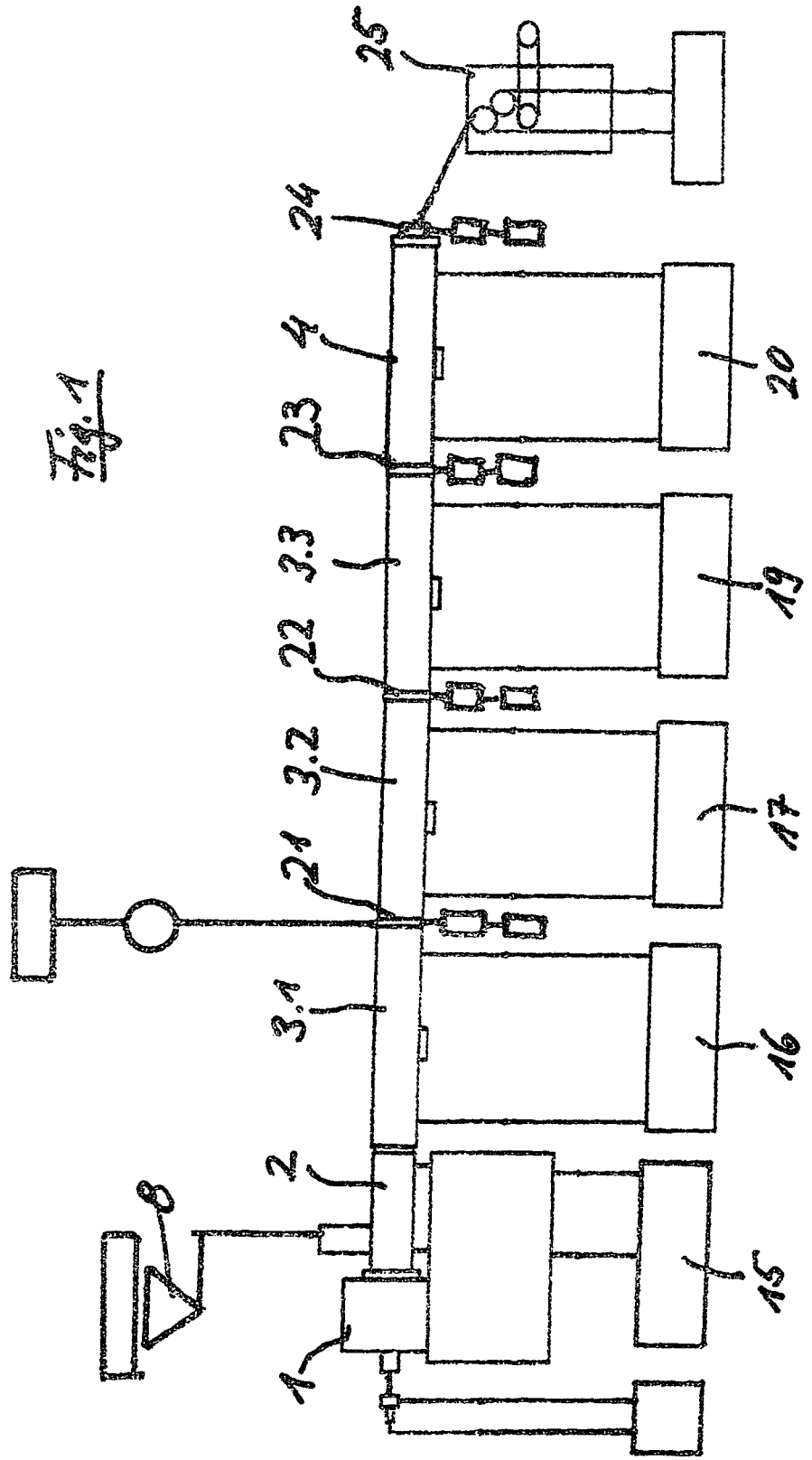
FIG. 1 is a schematic illustration of an extruder having multiple sections.

FIG. 1 shows an extruder with a drive 1, a feed supply 2, a plurality of planetary roller extruder sections 3.1, 3.2, 3.3, 4 and a discharge die 6. Into the feed supply 2 leads into a dosing 8. From the container 8 a dosing pipe leads into the feed supply 2.

The dosing is filled in a not shown form with fine-grained raw material for its processing and closed.

The raw material arrives in the feed supply 2 and is conveyed from there in extrusion direction. In the drawing, the extrusion direction points from left to right.

The feed supply 2 is designed in modular design. This module has the design of a planetary roller extruder.

In the feed supply 2, a first heating takes place. For the heating of the raw material, a heating-cooling circuit 15 is provided. The heating-cooling circuit 15 interacts with the housing shell of the module. Via the housing shell, the heat is transferred to the supplied raw material. In addition, the screw rotating in the module 2 generates a heating of the raw material.

In the execution example, the raw material, at its preheated temperature, enters the next extruder section/module 3.1. The extruder section/module 3.1 is followed by extruder sections/modules 3.2 and 3.3, 4. The modules 3.1 to 4 have the construction design of planetary roller extruders. The modules 2, 3.1, 3.2 and 3.3, 4 have coordinated housings and not depicted connection flanges at which they are connected with each other. The connection is a screw connection.

In the planetary extruder roller sections/modules 3.1, 3.2 and 3.3, 4, the raw material is kneaded multiple times between the rotating planetary spindles, the central spindle, and the internally toothed extruder housing so that always new surfaces are created which can be used for the heat transfer. Thereby, the heat from the housing shell can be transferred to the raw material or detracted from the raw material and dissipated via the housing shell. Like in module 2, the modules 3.1, 3.2 and 3.3 as well as 4 are equipped with heating-cooling circles 16, 17, 19, 20.

In the extruder sections/modules 3.1, 3.2 and 3.3, the raw material is brought to melt temperature and homogenized and in the extruder section/module 4 cooled to discharge temperature. The heating-cooling circuits 16, 17, 19, 20 secure the maintenance of the desired temperature. Thereby, heat is introduced into the raw material by the deformation work of the extruder sections/modules. In case that the heat supply is insufficient to achieve the desired temperature, the missing heat is transferred from the heating-cooling circuits via the corresponding housing shell of the module to the raw material. As far as the heat quantity generated by the deformation work exceeds the desired temperature of the required heat quantity, the excess quantity is dissipated via the heating-cooling circuits.

In addition, in the execution example is provided a supply of liquid process agents for the processing of the raw material. The supply takes place via an injection ring 21. The injection ring 21 is provided between the modules 3.1 and 3.2. The injection ring 21 is connected via a line to a pump and an oil reservoir.

In the execution example, the injection ring 21 forms the stop ring for the rotating planetary spindles of the module 3.1. Furthermore, openings are provided on the injection 21 in which pressure measuring devices and temperature measuring devices are located. These devices are integrated in the control of the heating-cooling circuits. Concerning the details of the injection ring 21 and its arrangement in the housing reference is made to the DE19720916B4. Stop rings 22 and 23 are also provided on the modules 3.2 and 3.3 by which pressure measurements and temperature measurements can be carried out as on the module 3.1.

The raw material is discharged from the extrusion line at a certain exit temperature. For this, the module 4 is provided on the outlet side with a round die 24 with a diameter of 20 mm. The discharged raw material is cooled between cooling rolls 25.

The execution example according to FIG. 5 differs from the execution example according to FIG. 1 by a degassing 27 and by an additional dosing 28. The degassing 27 consists of a laterally flanged twin-screw extruder with which the melt discharge can be avoided, but an outgassing is admitted. The outgassing is effected by an induced draft adjacent to the twin-screw extruder.

The additional dosing 28 is used for mixing in an additive.

FIG. 3 schematically shows conventional planetary spindles 321 for planetary roller extruders. These planetary spindles 321 form multi-flight screws which extend over the entire length of the spindle with constant inclination. The screw flights are depicted in the drawing by lines running obliquely to the longitudinal axis of the spindle.

In the side view right, the screw flights run from right, clockwise. The screws have a toothing on the outside. The corresponding mirror-image toothing is located on the central spindle of the planetary roller extruder section and the internally toothed surrounding housing so that the planetary spindles 321 can mesh with both the toothing of the housing and the central spindle.

FIG. 4 shows known planetary spindles 322, which on the one hand have the same screw flights as the screws/spindles according to FIG. 3. On the other hand, the spindles have at the same time left-handed grooves which cross the right-handed running screw flights. The left-handed grooves are depicted with lines in the FIG. 4 which are crossing rectangularly the screw flights known from FIG. 3. This is depicted with crossing lines. Due to the crossing grooves, the lads of screw between the screw flights, forming in the cross section the teeth of the toothing, are interrupted. The teeth remaining between two interruptions form a spiky/nap-like tooth. The many side by side occurring spikes/naps lead to the name nap toothing. In the following, the interruptions are referred to as tooth gaps.

FIG. 2 shows further planetary spindles 323 with a part 325, which is replicated of the toothing according to FIG. 3, and with a part 324, which is replicated of the toothing according to FIG. 4.

Figure 6:
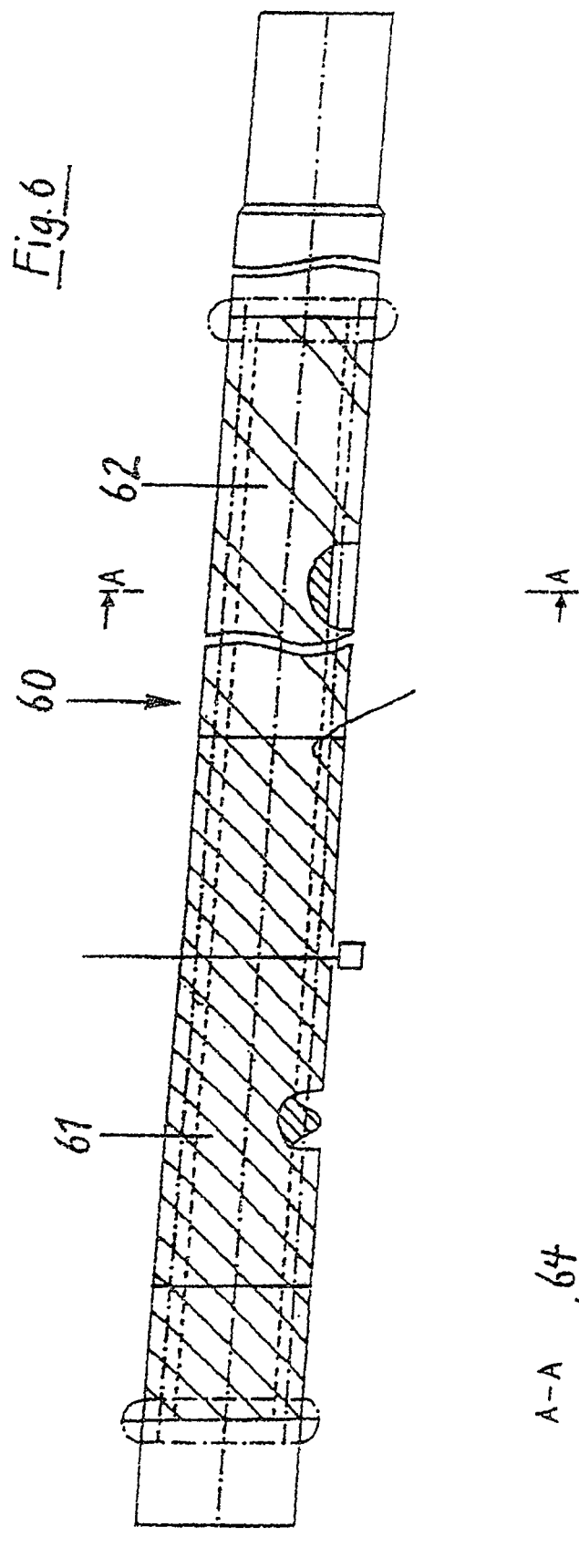
FIG. 6 is a schematic side view of a planetary spindle.
Figure 7:
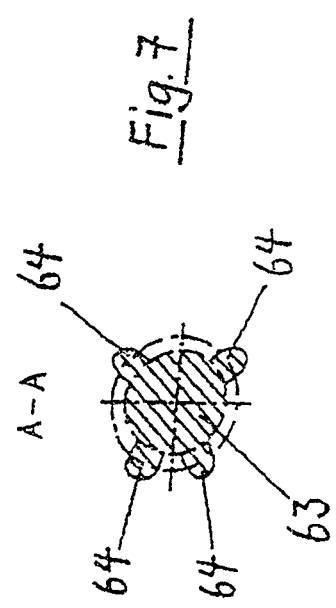
FIG. 7 is a cross sectional view A-A of the planetary spindle as shown in in FIG. 7.
Figure 8:
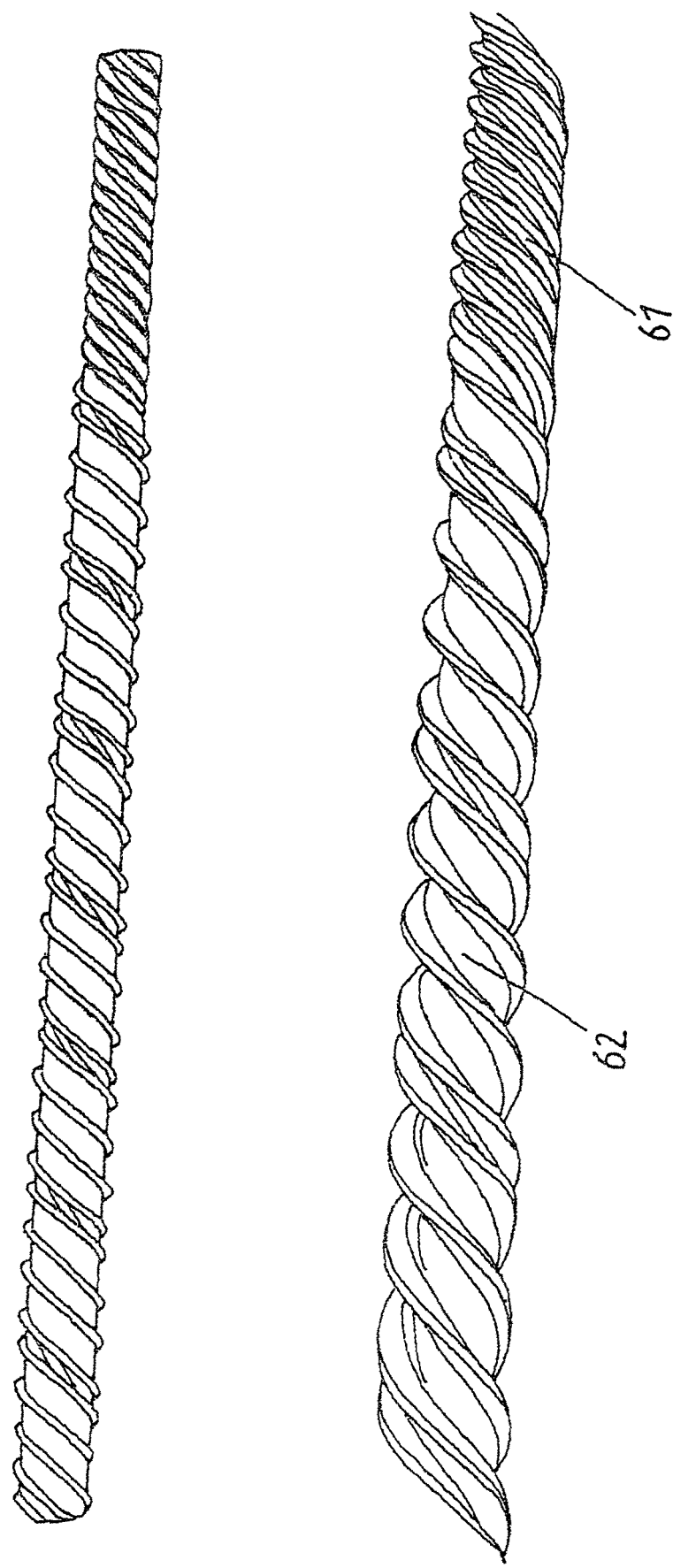
FIG. 8 shows an example of a planetary spindle.

FIGS. 6 to 8 show a planetary spindle 60 for the use of a planetary roller extruder in a drying station of a processing line. The planetary spindle 60 consists of two parts 61 and 62. The part 61 corresponds to a conventional planetary spindle with full tooth set. In the execution example, it is a planetary spindle with a pitch diameter of 34 mm, with an outside diameter of 42 mm and a diameter of 26 mm at the tooth root of the tooth set. In the execution example, the part 61 has a length of 200 mm. The total length of the planetary spindle 60 amounts to 1000 mm.

This results in a length of 800 mm for the part 62. The part 62 defines a range of the design of the planetary spindle, part 61 defines the remaining area. In part 61, the spindle has 7 teeth 64, which are similar to threads, but with a very large pitch at the outside of the planetary spindle. This is depicted in FIG. 8.

In part 62 three teeth 64 have been milled off. This is done before a surface hardening of the teeth 64. The distribution of the remaining teeth is shown in FIG. 7. Thereby, still two teeth 64 are adjoining. To the remaining teeth there is a tooth gap.

The planetary spindles according to FIGS. 6 to 8 are called transport spindles because they have—in contrast to the nap spindles—a greater transport effect. However, it has also become apparent, that the deformation work done by the transport spindles is surprisingly low. The energy input into the raw material is correspondingly low. This makes it easier to comply with the temperature control needed for the raw material.

The execution examples according to FIGS. 1 and 5 refer to an extruder with 70 mm housing diameter (based on the pitch diameter of the internal toothing of the housing). The maximum number of planetary spindles for the set of the modules 3.1, 3.2, 3.3 and 4 amounts to 7. There are 6 planetary spindles each of the design according to the FIGS. 6 and 8 provided for the processing of raw material in each module. In other execution examples are in the different modules different planetary spindles provided. Thereby, the differences can be related to the "missing" teeth. The differences can also result from the combination with spindles of another design. The differences can also result from the combination of different toothings at individual or all planetary spindles. At least, one planetary spindle designed partly as transport spindle is provided in the extrusion line.

Figure 9:
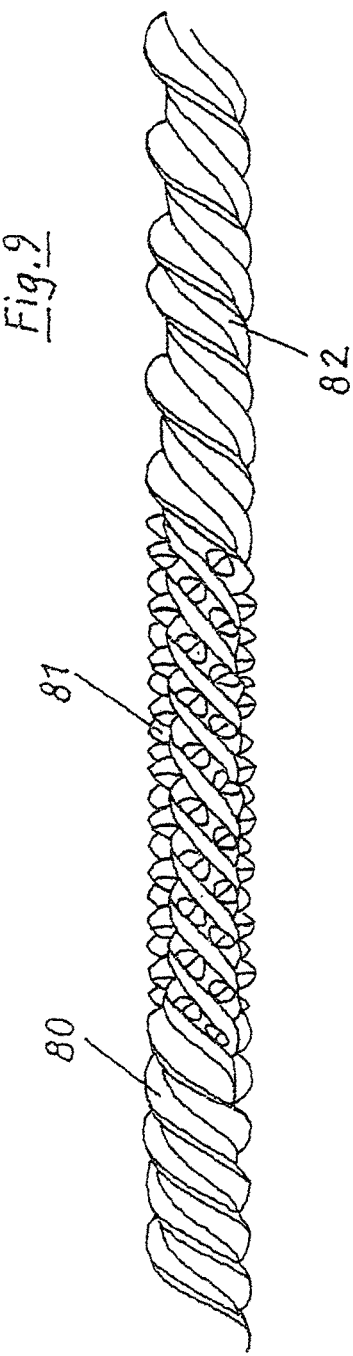
FIG. 9 shows another example of a planetary spindle.

FIG. 9 shows a planetary spindle with a conventional toothing 80 at one end, then a range 81 with a nap toothing, and a range 82 with a reduced toothing as described above.

Figure 10:
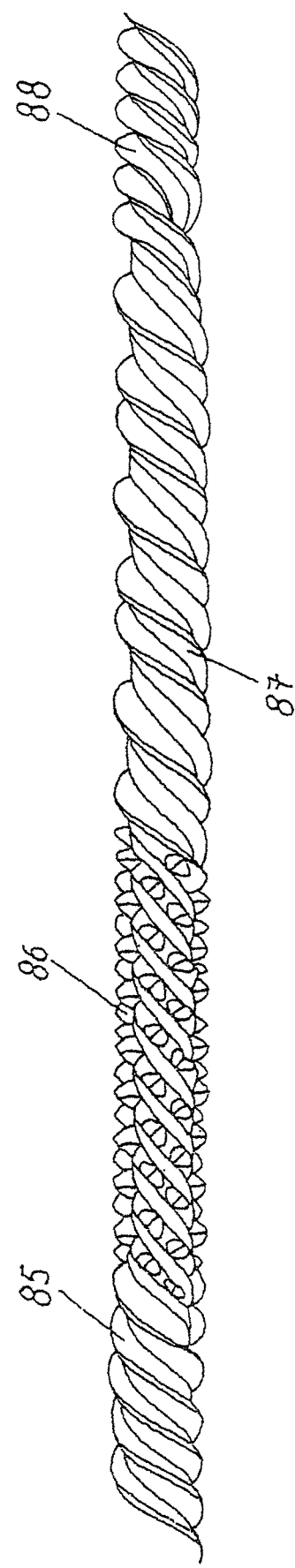
FIG. 10 shows yet another example of a planetary spindle.

FIG. 10 shows a planetary spindle with a conventional toothing 85 at one end, then a range 86 with a nap toothing, then a range 87 with a reduced toothing and again a conventional toothing at the other end of the spindle.

In the execution examples, the length of the modules amounts to 400 mm. in the execution example, the planetary spindles have a shorter length, partly a different length.

Figure 11:
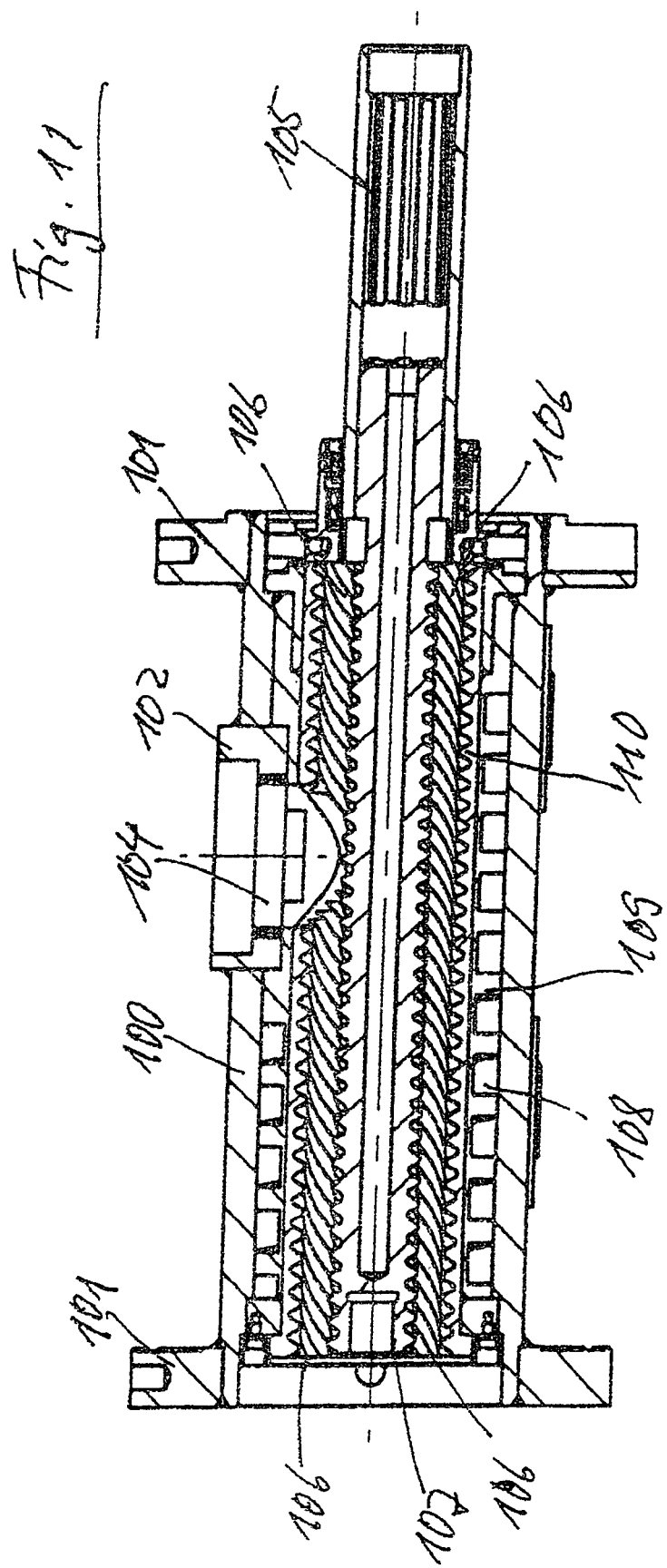
FIG. 11 is a cross sectional view of a feed part in form of a planetary extruder module.
Figure 12:
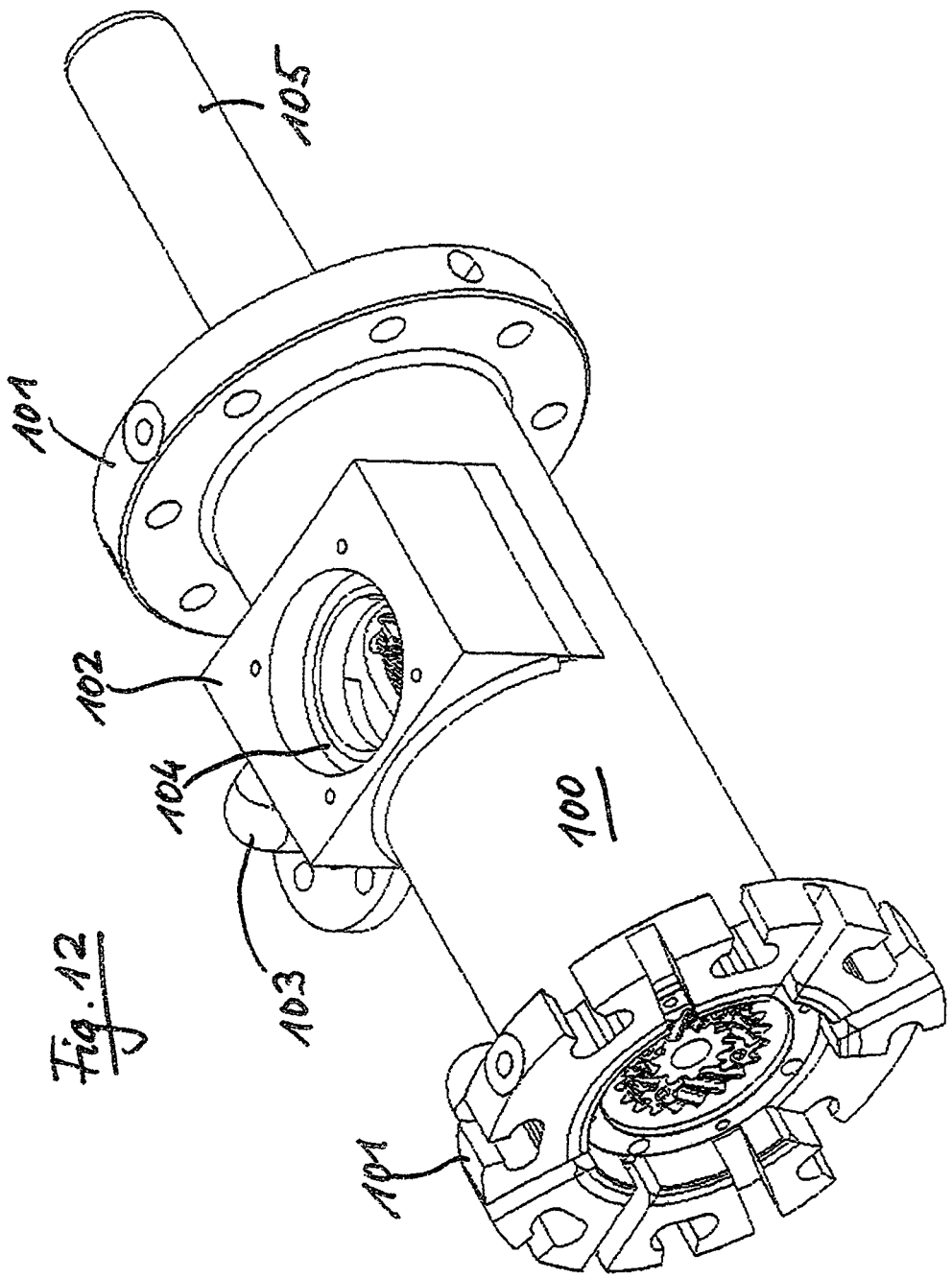
FIG. 12 is a perspective view of a feed part in form of a planetary extruder module.

According to FIGS. 11 and 12 is the feed supply 2 designed as planetary roller extruder module. The planetary roller extruder includes a housing too, that at every end is equipped with a flange 101. Moreover, the housing has a liner 109, which is equipped with an internal toothing 110. Outside, heating-cooling channels 108 are incorporated into the liner. In the assembled state, the heating-cooling channels 108 are externally closed by the housing. At the ends of the heating-cooling channels 108 there are provided feed lines/discharge lines for a heating-cooling agent. In FIG. 12 is a connection depicted of the two feed lines/discharge lines.

Centrically in the housing too there is arranged a central spindle 107. At the drive side the central spindle 107 is designed as spine shaft 105, in order to correspond with a gear motor.

Between der internal toothing 110 and the central spindle 107 there are intended planetary spindles 106. The planetary spindles 106 mesh with the toothing of the central spindle 107 and the internal toothing 110. In the drawing, the planetary spindles 106 show a conventional/standard toothing like the central spindle and the liner 109. Other than depicted, these are transport spindles.

Moreover, at the top of the housing too, a flange 102 is provided with an inlet opening 104 for the raw material intended for extrusion. A feed hopper is attached to the flange 102.

Figure 13:
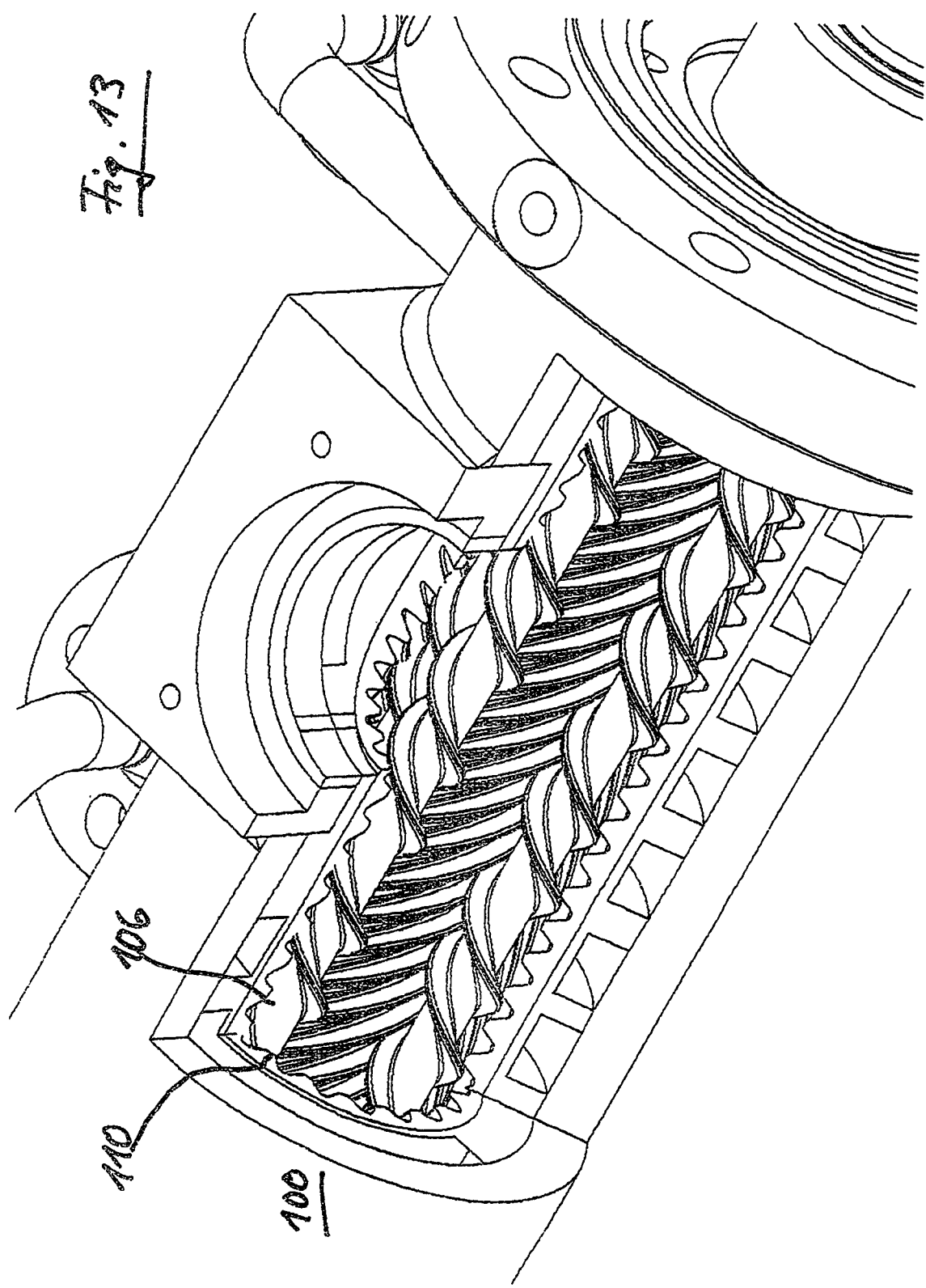
FIG. 13 is a partially cut away view of a feed part in form of a planetary extruder module.

FIG. 13 shows the feeder with an opened shell so that the view onto the transport spindles 106 is unobstructed.

In operation, the extrusion material/raw material from the feed hopper, not depicted, runs without pressure into the inlet opening 104 of the shell 100. Without pressure means that no pressure is exerted in direction of the inlet opening on the material except the weight of the material column standing over the inlet opening 104. The extrusion material enters between the transport spindles 106 and is caught by the transport spindles and brought extremely gently to blend and conveyed in the direction of the other planetary roller extruder sections/modules in order to be further processed there.

Figure 14:
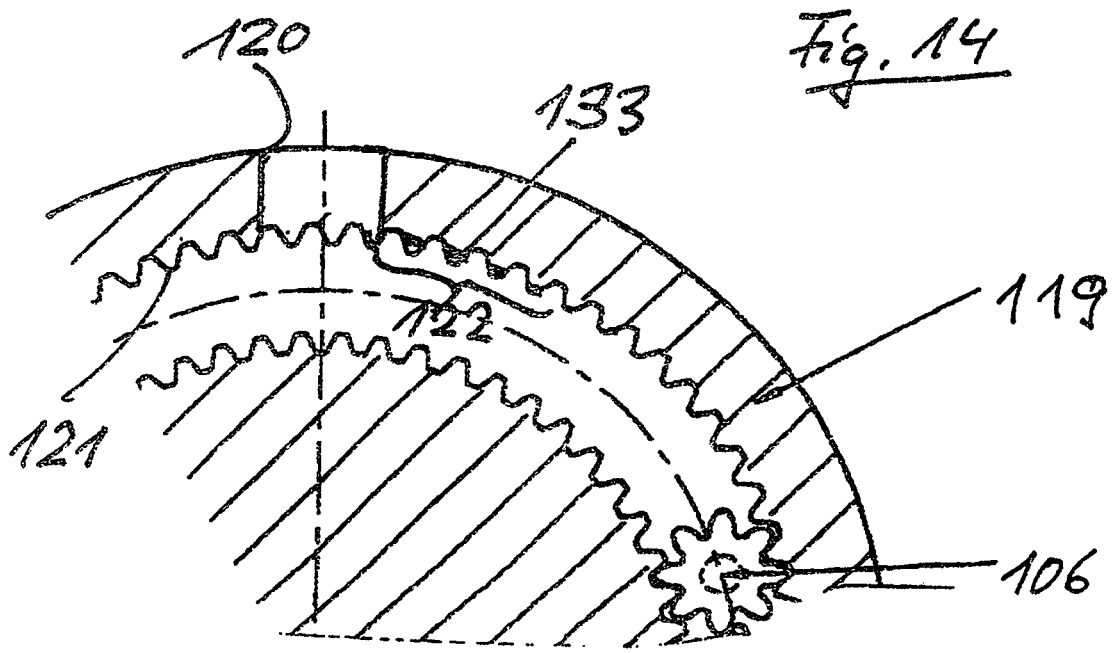
FIG. 14 is a cross sectional view of a planetary extruder module with an inlet opening.
Figure 15:
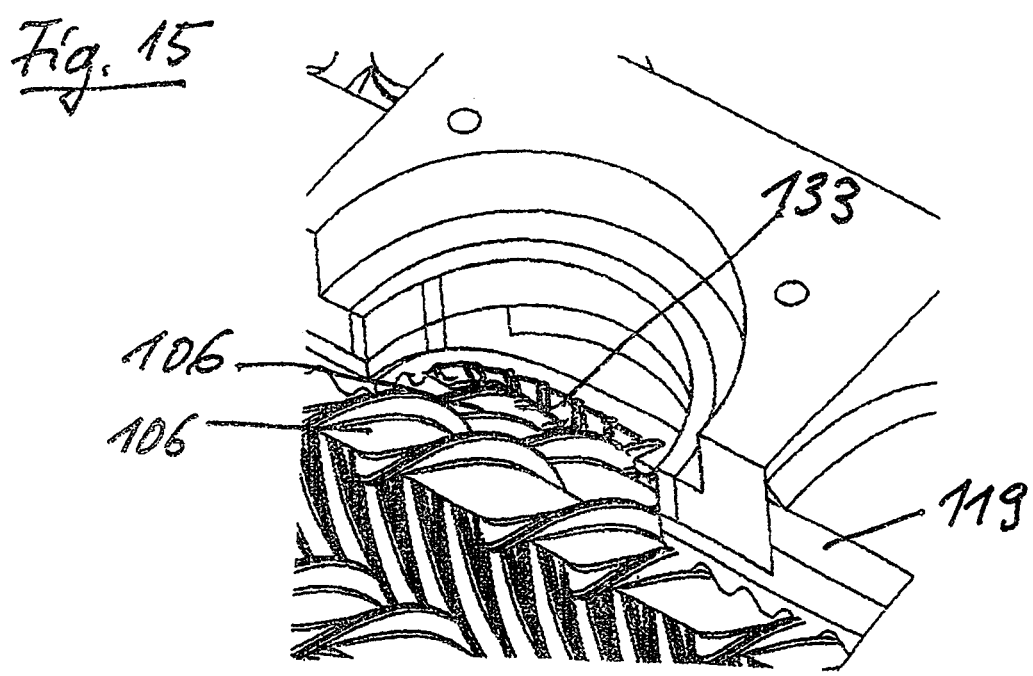
FIG. 15 is a partially cut away view of a planetary extruder module with an inlet opening.

FIGS. 14 and 15 show a further execution example. The further execution example according to FIG. 14 differs from the execution example according to FIGS. 11 to 13 by another housing shell 119. The housing shell 119 also has an inlet opening 120 for the raw material. Moreover, the housing shell 119 is equipped with an internal toothing 121, which is suitable like the internal toothing according to FIGS. 11 to 13 to interact with the planetary spindles 106. In contrast to the internal toothing of the housing according to FIGS. 11 to 13, the internal toothing 121 flattened in the area 122 joining the inlet opening 120 and which extends in direction of rotation of the central spindle. In the depiction according to FIG. 14, the direction of rotation of the central spindle runs clockwise.

At the end adjacent the inlet opening, the teeth are reduced by ¾ of their depth due to the flattening. In the execution example, this flattening 133 decreases in the direction of rotation of the central spindle. Thereby, the flattening 133 in the execution example extends over ⅒ of the circumference of the pitch circle belonging to the internal toothing of the housing. In other execution examples, the area may extend over at least ¼ of the circumference of the pitch circle or at least ½ of the circumference of the pitch circle or at least ¾ of the circumference of the pitch circle. Thereby, the dimension of extent of the area 122 is determined from the point at which the area 122 in the depiction according to FIG. 14 with a cut through the middle of the inlet opening being circular in the transversal section adjoins the inlet opening.

The direction of extent of the area 122 extends in the depiction according to FIG. 14 solely in the circumferential direction. In other execution examples, the direction of extent shown in FIG. 14 can also run in circumferential direction and at the same time inclined to the longitudinal direction of the housing.

FIG. 15 shows that the flattening 133 extends in the execution example over the entire opening width of the inlet opening. In other execution examples, the flattening extends at most over 90% of the opening width of the inlet opening, in still further execution examples over at most 80% of the opening width of the inlet opening and in still other execution examples over at most 70% of the opening width of the inlet opening.

In still further executions, the flattening 133 can extend over the width depicted in FIG. 15 also beyond the opening width of the inlet opening, for example, by at most further 10% of the openings width or by at most further 20% of the opening width or by at most 30% of the opening width.

The flattening shown in FIGS. 14 and 15 forms a feed hopper which facilitates the supply of the raw material into the extrusion line.

Figure 16:
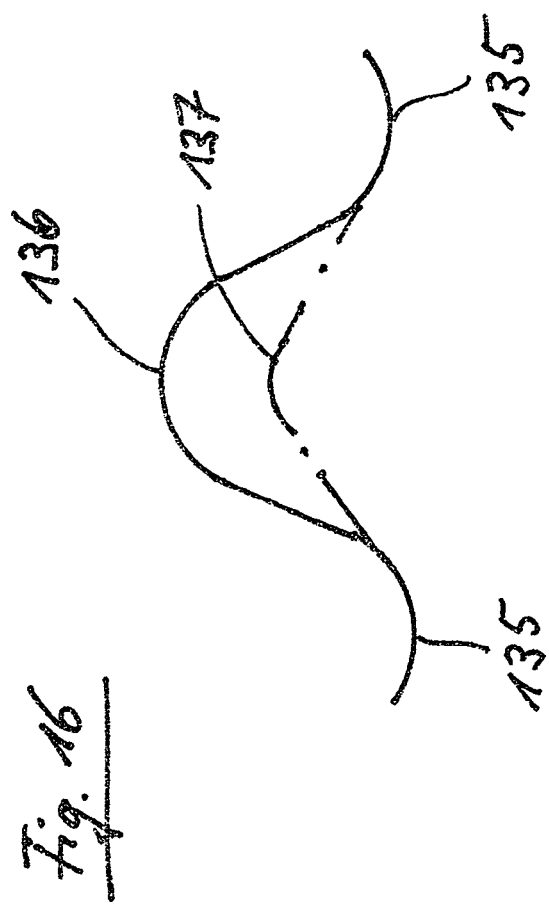
FIG. 16 is schematic illustration of different teeth depths.

FIG. 16 shows an original tooth 136 between tooth gaps 135. The depiction includes a section of the internal toothing of a housing. By spark erosion a dash-dotted depicted tooth 137 is shown with lower depth, round head and tooth flanks, which have a lower inclination towards the pitch diameter of the internal toothing than the tooth flanks of the original tooth 136.

Figure 17:
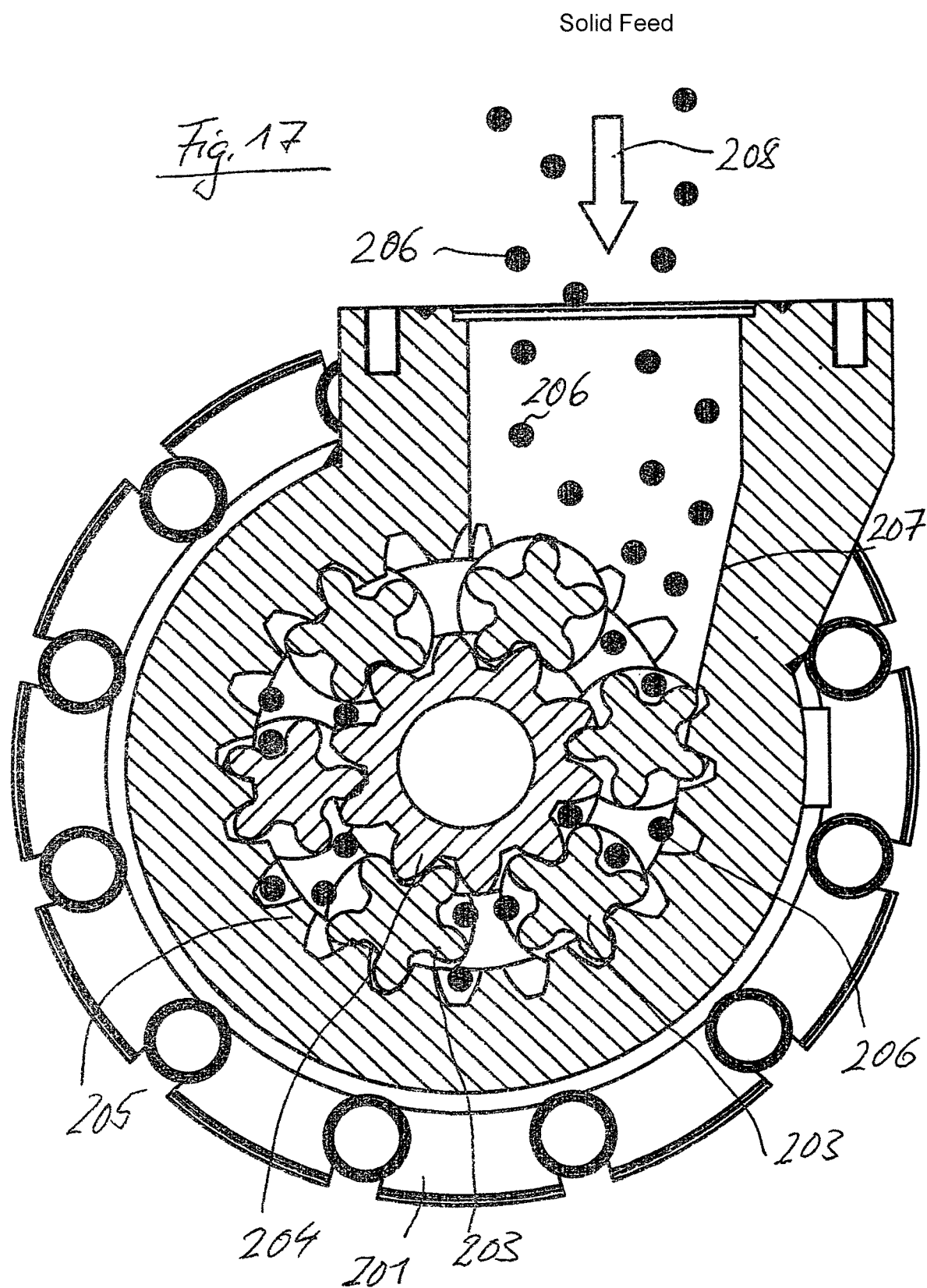
FIG. 17 shows a cross section through a planetary roller extruder section with supply for solid matters.

FIG. 17 shows a cross section through a planetary roller extruder section with supply for solid matters 202. The cross section shows a housing 201 with an internal toothing 205. A central spindle 204 and planetary spindles 203 are rotating in the housing 201.

The supply for solid matters 202 has a non-depicted hopper with a cylindrical outlet which is flanged to the housing 201. The hopper with the cylindrical outlet is—with regard to the center of the central spindle 204—arranged eccentrically. That means, the center axis 208 of the feed 202 passes by in a distance at the center axis of the central spindle. The distance of both axes is in the execution example slightly larger than a quarter of the pitch diameter of the internal toothing of the housing 205, but essentially smaller than half the pitch diameter of the internal toothing of the housing 205. Consequently, the central axis 208 points into an area of the movement path of the planetary spindles 203, in which the planetary spindles 203 move down significantly after having reached the highest positions in the view according to FIG. 17. On the way, the material is much better fed into the planetary roller extruder module than in the conventional arrangement of material supply above the planetary roller extruder module, where the central axis of the material supply is perpendicular to the central axis of the planetary roller extruder module. The material is depicted schematically with particles 206 in the view according to FIG. 17.

As a result of the dimensions of the supply 202, the supply at the eccentric arrangement of the supply 202 protrudes in the vertical projection on a horizontal level in which the center axis of planetary roller extruder module is located compared to the planetary roller extruder module. In order to guide the solid particles 206 well into the planetary roller extruder module, a tapered transition 207 is intended from the material supply into the planetary roller extruder module. In the execution example, the transition forms a bevel. The bevel proceeds at an angle of 60 degrees to the horizontal.

Figure 18:
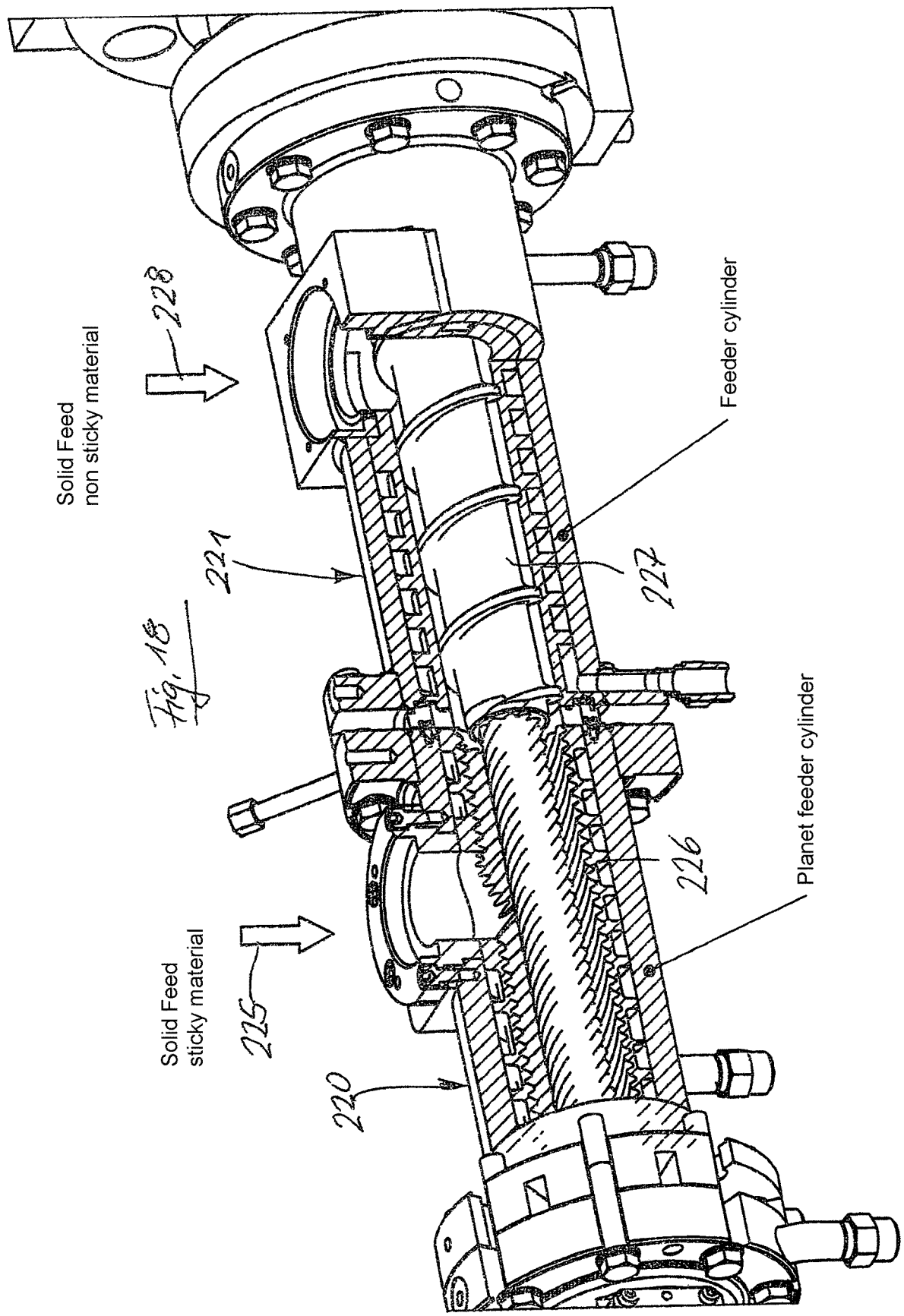
FIG. 18 shows a planetary roller extruder module used as a feed part and a single-screw extruder module used as a further feed part.

FIG. 18 shows a planetary roller extruder module 220 used as a feed part and a single-screw extruder module 221 used as a further feed part. To the planetary roller extruder module 220 belong planetary spindles 226 and a material supply as depicted in FIG. 17. To the single-screw module 221 belong a feed screw 227 and a material supply 228. The material supply 228 serves to supply non-adhesive material, the material supply 225 to supply material that tends to stick/adhere.

FIGS. 19 to 22 show a planetary spindle for the use in feed parts of planetary roller extruder modules as depicted in FIGS. 11 to 15 and 17, 18. Depicted is a staged transport spindle.

Figure 19:
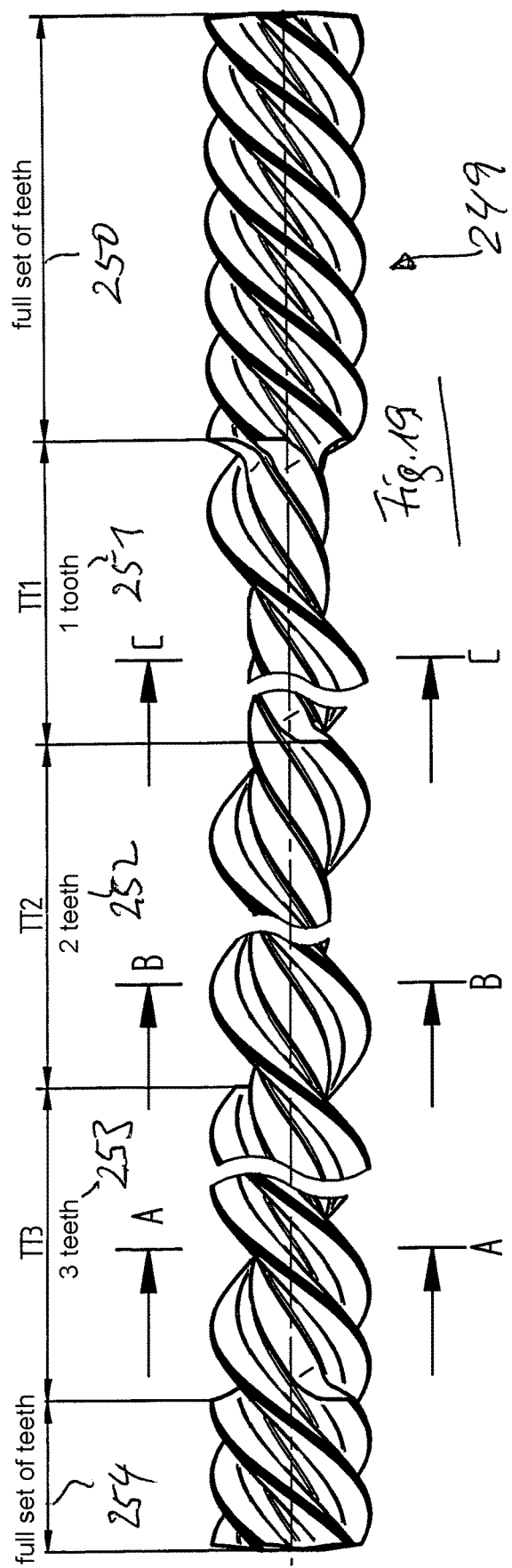
FIG. 19 is a side view of a planetary spindle with multiple stages.

Traditional transport spindles are depicted and described in FIGS. 6 and 7. The planetary spindle as shown in FIG. 19, in contrast, is a transport spindle with three different areas 251, 252 and 253. All areas 251, 252 and 253 have the same axial length in the execution example. The area 251 shows a tooth reduction to one tooth 255, the area 252 a tooth reduction to two teeth 255, 257 and the area 253 a tooth reduction to three teeth 255, 256, 257.

Figure 22:
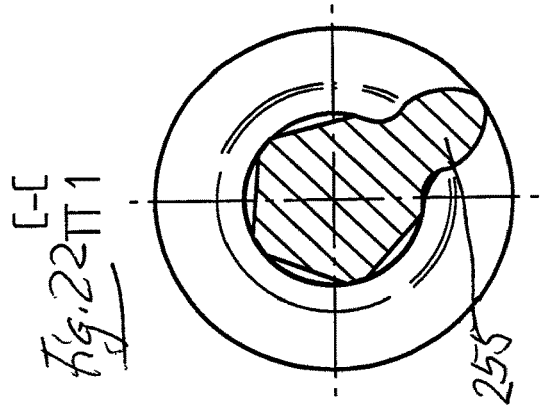
FIG. 22 is a cross sectional view C-C of the spindle shown in FIG. 19.
Figure 21:
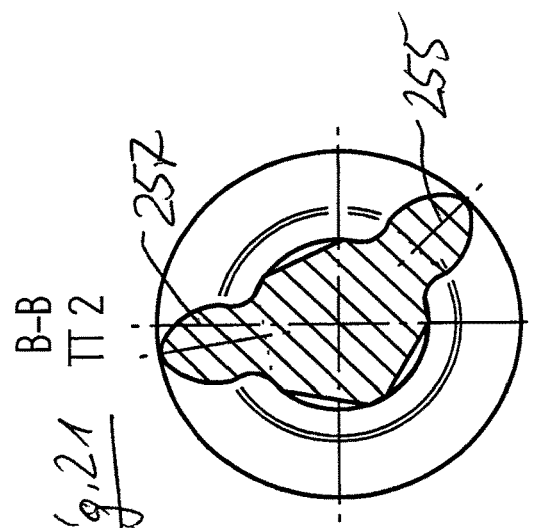
FIG. 21 is a cross sectional view B-B of the spindle shown in FIG. 19.
Figure 20:
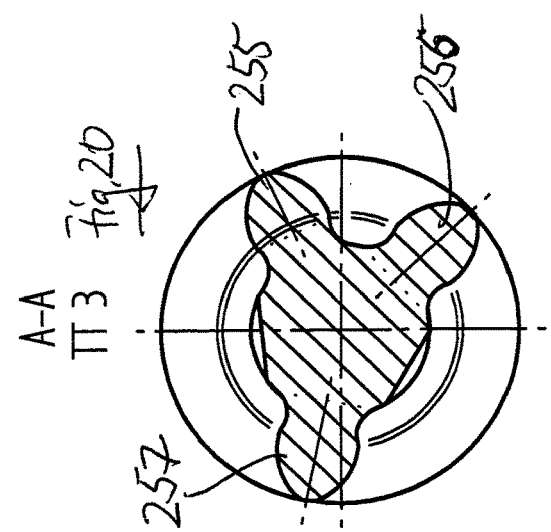
FIG. 20 is a cross sectional view A-A of the spindle shown in FIG. 19.

The tooth reduction in the area 251 is, according to FIG. 22, depicted in one cut along the line C-C; the tooth reduction in the area 252 is, according to FIG. 21, depicted in one cut along the line B-B and the tooth reduction in the area 253 in one cut along the line A-A.

At both ends of the planetary spindle 249 there are guiding areas 250 and 254. The guiding area 250 has three times the guide length in relation to the guide length of the guiding area 254. The guiding area 250 is located at the drive-side end of the planetary spindle. Drive-side means: at the end facing the extruder drive. All guiding areas have full toothing/conventional toothing. The full toothing is characterized by a full number of teeth.

The invention claimed is:

1. A planetary roller extruder section forming a feed part of an extruder, comprising:
    an internally toothed housing;
    an inlet opening extending through the internally toothed housing;
    an externally toothed central spindle disposed centrally within and at a distance from the housing; and
    planetary spindles arranged to rotate in a void between the central spindle and the housing, each planetary spindle having an external toothing meshing with both the housing and the central spindle,
    wherein at least one planetary spindle comprises at least two axially spaced areas including a first area having a first number of teeth, the first number of teeth being less than a full set of teeth, and a second area having a second number of teeth, the second number of teeth being less than a full set of teeth and more than the first number of teeth, and wherein the first area of the at least one planetary spindle is arranged at an axial osition of the inlet opening.

2. The planetary roller extruder section as in claim 1, wherein the first area and the second area have the same length.

3. The planetary roller extruder section as in claim 1, wherein the first area and the second area have different lengths.

4. The planetary roller extruder section as in claim 1, comprising a transition area between the first area and the second area in which teeth that are present in the second area and not present in the first area gradually taper off from their total depth, a length of the transition area being at least 0.5 times the depth of the teeth.

5. The planetary roller extruder section as in claim 4, wherein the length of the transition area is at least equal to the depth of the teeth.

6. The planetary roller extruder section as in claim 1, wherein the at least one planetary spindle has a drive-side guiding area with full toothing disposed at an end of the planetary roller extruder section proximal to a drive.

7. The planetary roller extruder section as in claim 6, wherein the drive-side guiding area has an axial length which is at least equal to an external diameter of the planetary spindles.

8. The planetary roller extruder section as in claim 6, wherein the at least one planetary spindle has a further guiding area disposed at an opposite end of the drive-side guiding area, a length of the further guiding area being between 0.2 times and 0.7 times an axial length of the drive-side guiding area.

9. The planetary roller extruder section as in claim 6, wherein the at least one planetary spindle has a further guiding area disposed at an opposite end of the drive-side guiding area, a length of the further guiding area being between 0.3 times and 0.4 times an axial length of the drive-side guiding area.

10. The planetary roller extruder section as in claim 1, wherein the internally toothed housing comprises an internally toothed liner disposed within the housing.

11. The planetary roller extruder section as in claim 1, wherein the at least one planetary spindle has a drive-side guiding area with full toothing disposed at an end of the planetary roller extruder section proximal to a drive and a further guiding area with full toothing disposed at an opposite end of the drive-side guiding area.

* * * * *